United States Patent
Vaid

(10) Patent No.: US 7,912,761 B2
(45) Date of Patent: *Mar. 22, 2011

(54) INITIAL PRODUCT OFFERING SYSTEM AND METHOD

(75) Inventor: Rahul R. Vaid, Dallas, TX (US)

(73) Assignee: Tech Venture Associates, Inc., Dallas, TX (US)

( * ) Notice: Subject to any disclaimer, the term of this patent is extended or adjusted under 35 U.S.C. 154(b) by 1227 days.

This patent is subject to a terminal disclaimer.

(21) Appl. No.: 11/515,113

(22) Filed: Sep. 1, 2006

(65) Prior Publication Data
US 2007/0061220 A1    Mar. 15, 2007

Related U.S. Application Data

(63) Continuation-in-part of application No. 09/649,224, filed on Aug. 25, 2000, now Pat. No. 7,103,565.

(60) Provisional application No. 60/150,993, filed on Aug. 27, 1999.

(51) Int. Cl.
*G06Q 30/00* (2006.01)

(52) U.S. Cl. ...................................... 705/26.2

(58) Field of Classification Search ............... 705/26, 705/27, 37
See application file for complete search history.

(56) References Cited

U.S. PATENT DOCUMENTS

| | | | |
|---|---|---|---|
| 4,775,936 A | 10/1988 | Jung | |
| 5,077,665 A | 12/1991 | Silverman et al. | |
| 5,136,501 A | 8/1992 | Silverman et al. | |
| 5,168,446 A | 12/1992 | Wiseman | |
| 5,388,165 A | 2/1995 | Deaton et al. | |
| 5,459,306 A | 10/1995 | Stein et al. | |
| 5,515,268 A | 5/1996 | Yoda | |
| 5,528,490 A | 6/1996 | Hill | |
| 5,557,518 A | 9/1996 | Rosen | |
| 5,649,114 A | 7/1997 | Deaton et al. | |
| 5,664,115 A | 9/1997 | Fraser | |
| 5,689,652 A | 11/1997 | Lupien et al. | |
| 5,712,985 A | 1/1998 | Lee et al. | |
| 5,727,165 A | 3/1998 | Ordish et al. | |
| 5,758,328 A | 5/1998 | Giovannoli | |
| 5,794,207 A | 8/1998 | Walker et al. | |

(Continued)

FOREIGN PATENT DOCUMENTS

JP    7-73251 A    3/1995

OTHER PUBLICATIONS

Panczyk, T.D., "Policing Privacy," Collections & Credit Risk, vol. 3, No. 4, p. 27, Apr. 1998.*

(Continued)

*Primary Examiner* — Nicholas D Rosen
(74) *Attorney, Agent, or Firm* — Fish & Richardson P.C.

(57) ABSTRACT

A system and method for making an initial product offering of tangible products and services. A price for a product may be determined by calculating an aggregate customer history factor by aggregating customer history factors of potential purchasers in a buying group, calculating a cumulative demand for a product as a function of (i) expected purchase quantities of the product indicated by the potential purchasers in the buying group and (ii) the aggregate customer history factor, and setting a price of the product as a function of the cumulative demand for the buying group. The tangible products and services may be offered at the determined price.

21 Claims, 18 Drawing Sheets

U.S. PATENT DOCUMENTS

| | | | |
|---|---|---|---|
| 5,794,219 | A | 8/1998 | Brown |
| 5,799,285 | A | 8/1998 | Klingman |
| 5,809,144 | A | 9/1998 | Sirbu et al. |
| 5,818,914 | A | 10/1998 | Fujisaki |
| 5,832,459 | A | 11/1998 | Cameron et al. |
| 5,842,178 | A | 11/1998 | Giovannoli |
| 5,845,266 | A | 12/1998 | Lupien et al. |
| 5,857,175 | A | 1/1999 | Day et al. |
| 5,895,454 | A | 4/1999 | Harrington |
| 5,897,622 | A | 4/1999 | Blinn et al. |
| 5,909,023 | A | 6/1999 | Ono et al. |
| 5,915,209 | A | 6/1999 | Lawrence |
| 5,924,083 | A | 7/1999 | Silverman et al. |
| 5,956,709 | A | 9/1999 | Xue |
| 5,983,199 | A | 11/1999 | Kaneko |
| 6,009,411 | A | 12/1999 | Kepecs |
| 6,061,665 | A | 5/2000 | Bahreman |
| 6,085,169 | A | 7/2000 | Walker et al. |
| 6,101,484 | A | 8/2000 | Halbert et al. |
| 6,269,343 | B1 | 7/2001 | Pallakoff |
| 6,493,722 | B1 | 12/2002 | Daleen et al. |
| 6,604,089 | B1 | 8/2003 | Van Horn et al. |
| 6,615,183 | B1 | 9/2003 | Kolls |
| 6,618,709 | B1 | 9/2003 | Sneeringer |
| 6,631,356 | B1 | 10/2003 | Van Horn et al. |
| 6,876,983 | B1 | 4/2005 | Goddard |
| 6,934,690 | B1 | 8/2005 | Van Horn et al. |
| 7,103,565 | B1 * | 9/2006 | Vaid .................................. 705/26 |
| 7,124,107 | B1 | 10/2006 | Pishevar et al. |
| 7,146,330 | B1 | 12/2006 | Alon et al. |
| 7,263,498 | B1 | 8/2007 | Van Horn et al. |
| 7,349,879 | B2 | 3/2008 | Aslberg et al. |
| 7,533,032 | B1 * | 5/2009 | Selby .................................. 705/5 |
| 2001/0014868 | A1 | 8/2001 | Herz et al. |
| 2002/0026351 | A1 | 2/2002 | Coleman |
| 2002/0107773 | A1 | 8/2002 | Abdou |

OTHER PUBLICATIONS

U.S. Patent and Trademark Office's file, current as of Feb. 10, 2010, for U.S. Appl. No. 11/888,851, entitled Initial Product Offering System and Method, filed Aug. 2, 2007.

"Policing Privacy" Collections & Credit Risk, vol. 3, No. 4 (Apr. 1998), p. 27.

Microsoft Press Computer Dictionary, third edition, Microsoft Press, Redmond, 1997, pp. 84 and 383.

Anon, "VWR Scientific Products Corp. Uses Logility to Maintain Highest Inventor4y Management, Customer Service Goals," PR Newswire, Jul. 21, 1997.

Beckman, K., "Proxima Billing System Created for Multiservice Carriers," RCR Radio Communications Report, p. 31, May 31, 1999.

Anon., "Digex CEO Nancy Faigen to Execs: 'New Breed of Killer Applications' Driving Business Web Use".

Barron, J., "Consumer Saturday; Air Travel: Bumping Passengers," New York Times, Late City Final Edition, p. 46, col. 1, May 26, 1984.

Cohen, A., "Survey—Business Air Travel; Bumps Get Smoother," Financial Times, Survey London Edition, p. 4, Apr. 30, 1996.

Online Document from http://www.archive.org of Marcata website, "Mercata—Group Buying Power," http://web.archive.org/web/*/http://www.mercata.com/cgi-bin/mercata/mercata/v2/pages/home.jsp, from Aug. 16, 2000 (5 pages).

Online Document from http://www.archive.org of Shop2Gether website, "Group Buying—Shop 2gether.com," http://web.archive.org/web/20000621025658/http://www.shop2gether.com/asp/s2g.asp, from Jun. 21, 2000 (6 pages).

Online Document from http://www.archive.org of Groupbuy Center website, "Groupbuy Center—Buying Parts as a Group to Save Money," http://web.archive.org/web/20000619021126/http://www.groupbuycenter.com, from Jun. 19, 2000 (3 pages).

Online Document from http://www.archive.org of Groupbuy Center website, "Groupbuy Center FAQ," http://web.archive.org/web/20000609150538/http://www.groupbuycenter.com/faz.asp, from Jun. 9, 2000 (7 pages).

Online Document from http://www.archive.org of Online Choice website, "Welcome to OnlineChoice.com," http://web.archive.org/web/20001215125300/http://onlinechoice.com/US/Home/BODY/abo..., from Dec. 15, 2000 (3 pages).

Online Document from http://www.archive.org of mySimon.com website, "mySimon: Home," http://web.archive.org/web/20000815053232/http://www.mysimon.com/, from Aug. 15, 2000 (5 pages).

Online Document from http://www.archive.org of mySimon.com website, "About My Simon," http://web.archive.org/web/20001019090739/http://www.mysimon.com/corporate/index.jht..., from Oct. 19, 2000 (2 pages).

Online Document from http://www.archive.org of DealTime.com website, "DealTime.com: Comparison Shop for Almost Anything," http://web.archive.org/web/20000815052642/http://www.dealtime.com/, from Aug. 15, 2000 (6 pages).

Online Document from http://www.archive.org of NexTag website, "NexTag.com: About Us," http://web.archive.org/web/20000622011230/http://www.nextag.com/serv/main/about/about.jsp, from Jun. 22, 2000 (4 pages).

Online Document from http://www.archive.org of C-Tribe website, "C-Tribe— Shopping That Makes Cents," http://web.archive.org/web/2000081505026401/http://www.c-tribe.com/, from Aug. 15, 2000 (3 pages).

Online Document from http://www.archive.org of C-Tribe website, "How It Works," http://web.archive.org/web/20000815052738/http://www.c-tribe.com/static/how_it_works.h..., from Aug. 15, 2000 (3 pages).

Online Document from http://www.archive.org of C-Tribe website, "About C-Tribe," http://web.archive.org/web/20000815053015/http://www.c-tribe.com/static/about.html, from Aug. 15, 2000 (3 pages).

Online Document from http://www.archive.org of C-Tribe website, "C-Tribe Quick Tour," http://web.archive.org/web/20001019065102/http://www.c-tribe.com/static/tour_one.html, from Oct. 19, 2000 (3 pages).

Online Document from http://www.archive.org of Volume Buy website, "Volumebuy.com: Group Buying Aggregation," http://web.archive.org/web/20000622003829/http://volumebuy.com/, from Jun. 22, 2000 (5 pages).

Online Document from http://www.archive.org of Zwirl.com website, "Zwirl.com," http://web.archive.org/web/20000815052738/http://www.zwirl.com/corp/home, from Aug. 15, 2000 (3 pages).

Online Document from http://www.archive.org of Zwirl.com website, "Zwirl—Shoppers of the Net Unite!," http://web.archive.org/web/20000815053255/http://www.zwirl.com/hp, from Aug. 15, 2000 (3 pages).

Online Document from http://www.archive.org of Zwirl.com website "Zwirl.com—Site Demo," http://web.archive.org/web/20000815060345/http://www.zwirl.com/demo/demo.html, from Aug. 15, 2000 (2 pages).

Online Document from http://www.archive.org of MobShop.com website, "Palm, Pilots, digital cameras, mp3, & more at volume discounts: MobShop Network (sm)," http://web.archive.org./web/20000815054717/http://www.accompany.com/, from Aug. 15, 2000 (4 pages).

Online Document from http://www.archive.org of MobShop.com website, "Palm Pilots, digital cameras, mp3, & more at volume discounts: MobShop Network (sm)," http://web.archive.org/web/20000815052648/http://www.mobshop.com, from Aug. 15, 2000 (6 pages).

Online Document from http://www.archive.org of MobShop.com website, "MobShop: How It from Works," http://web.archive.org/web/20001010154909/http://www.mobshop.com/howitworks, from Oct. 10, 2000 (4 pages).

Online Document from http://www.archive.org of MobShop.com website, "MobShop: Our Policy," http://web.archive.org/web/20000815052824/http://www.mobshop.com/about_policy, from Aug. 15, 2000 (10 pages).

Online Document from http://www.archive.org of Yahoo! Inc. website, "Shopping and Services—Group Purchasing in the Yahoo! Directory," http://web.archive.org/web/20050326094214/dir.yahoo.com/business_and_economy/shoppi..., from Jun. 21, 2000 (3 pages).

Online Document from http://www.archive.org of RedHerring.com website, "ActBig.com Muscles in On Group Buying Power," by Sarah Lai Stirland, http://web.archive.org/web/20000613170551/http://redherring.com/insider/1999/1013/news..., from Jun. 13, 2000 (9 pages).

Online Document from http://www.archive.org of RedHerring.com website, "Redherring.com—Getting out of retail—Jan. 6, 2000," by Rafe Needleman, http://web.archive.org/web/20000817022144/http://redherring.com/cod/2000/0106.html, from Aug. 17, 2000 (5 pages).

Online Document from http://www.archive.org of RedHerring.com website, "Redherring.com—The Web changes the rules of the pricing game—May 1, 2000," http://web.archive.org/web/20000817040719/http://redherring.com/industries/2000/0501/res..., from Aug. 17, 2000 (4 pages).

Online Document from http://www.archive.org of RedHerring.com website, Redherring.com—New mediator—From the Oct. 1999 issue, "New Mediator: The Music Industry Needs to Offer More Than Clever Business Models," by Alex Gove, http://web.archive.org/web/20000817054906/http://redherring.com/mag/issue71/news-medi..., from Aug. 17, 2000 (7 pages).

Oreskovic, Alexei, "Let's Make A Deal," LexisNexis AlaCarte!, Copyright 2000 Industry Standard Communications, Inc., Feb. 28, 2000 (3 pages).

Oreskovic, Alexei, "Secret Shopper: The Price is Right?," LexisNexis AlaCarte!, Copyright 2000 Industry Standard Communications, Inc. Feb. 28, 2000 (2 pages).

Online Document from http://www.archive.org of E-Commerce Times website, E-Commerce Times: Breaking News, "Paul Allen Backs Another 'Revolution'," by Mary Hillebrand, http://web.archive.org/web/20000815223133/http://www.ecommercetimes.com/news/article..., from Aug. 15, 2000 (11 pages).

Online Document from http://www.archive.org of TheStandard.com website, The Standard.com: Accompany Wins Group-Buying Patent, "Accompany Wins Group-Buying Patent" by Jennifer Couzin, http://web.archive.org/web/20000830075113/http://www.thestandard.com/article/article_pri..., from Aug. 30, 2000 (3 pages).

Mieszkowski, Katharine, "What'n the Heck is MobShop?," LexisNexis AlaCarte!, Copyright 2000 Salon.com, Inc., Mar. 29, 2000 (2 pages).

Online Document from http://www.archive.org of Business2.com website, "Riding the Buy Cycle: The founders of Accompany believe there's strength in numbers and are helping average consumers pool their buying power to get volume discounts," by Michael Grebb, http://web.archive.org/web/20000902180036/http://www.business2.com/content/magazine/indepth/1999/0..., from Sep. 2, 2000 (3 pages).

Online Document from TheStandard.com, http://www.thestandard.com/newsletters/newsletterBottomframe/0.3679,106-858.00.html, The Industry Standard's Shop Grok, May 20, 1999, Selection pp-01 and pp=02 "Resistance is Futile: Collective Purchasing Model Gets Deep Pockets," Printed Aug. 19, 2000.

Online Document from TheStandard.com, http://www.thestandard.com/article/article_print/1,1153,13535,00.html, "Group Buying Services Still Groping," Printed Aug. 19, 2000.

Mieszkowski, K., "What'n. The Heck is MobShop?" Salon.com, Mar. 29, 2000.

Muehlbauer, J., "Group Buying Services Still Groping," www.thestandard.com, Mar. 30, 2000.

Anon., "Resistance Is Futile: Collective Purchasing Model Gets Deep Pockets," www.thestandard.com, May 20, 1999.

* cited by examiner

FIGURE 2 — Table 200

| PROD. ID# (205) | VENDOR NAME (210) | PRODUCT NAME (215) | PRODUCT DESCRIPTION (220) | RELEASE DATE (225) | AVAILABLE DATE (230) | MSRP | PRICING RANGE MAX (235) | PRICING RANGE MIN (240/245) |
|---|---|---|---|---|---|---|---|---|
| 101 | FORD | TOY 2000 | AUTOMOBILE | Dec-99 | Dec-99 | $20,000 | $20,000 | $14,000 |
| 102 | ETHAN ALLEN | BED 2001 | FURNITURE | Jun-00 | May-00 | $2,000 | $2,000 | $800 |
| [...] | [...] | [...] | [...] | [...] | [...] | | [...] | |
| 201 | GUCCI | SODA PANTS | APPAREL | Mar-00 | Apr-00 | $4,000 | $4,000 | $2,500 |
| [...] | [...] | [...] | [...] | [...] | [...] | | [...] | |
| [...] | [...] | [...] | [...] | [...] | [...] | | [...] | |

FIGURE 3 — Table 300

| PRODUCT ID# (205) | CONDITIONS OF INDICATIONS OF INTEREST (305) | | | | |
|---|---|---|---|---|---|
| | PRICING DATE (310) | MIN # INDICATIONS (315) | CONDITION 3 (320) | CONDITION 4 (325) | (335) |
| 101 | 12/01/99 | 10 | [...] | [...] | |
| 102 | 05/01/00 | 25 | [...] | [...] | |
| [...] | [...] | [...] | [...] | [...] | |
| 201 | 06/01/00 | 40 | [...] | [...] | |
| [...] | [...] | [...] | [...] | [...] | |
| [...] | [...] | [...] | [...] | [...] | |

400

| DEMAND PACKET ID# | DEMAND DESTN ID# | PRODUCT ID# | CUSTOMER ID# | INDICATION DATE | QUANTITY | CUMM. DEMAND SIZE | CUSTOMER HISTORY FACTOR | PRICING DATE |
|---|---|---|---|---|---|---|---|---|
| A2004 | DD20 | 123 | C002 | 04/15/00 | 2 | 2 | 68% | 6/22/2000 |
| B2006 | DD21 | 333 | C001 | 06/01/00 | 1 | 25 | 23% | 4/28/2000 |
| [...] | [...] | [...] | [...] | [...] | [...] | [...] | [...] | [...] |
| F2005 | DD04 | 102 | C002 | 03/01/00 | 4 | 88 | 68% | 4/30/2000 |
| [...] | [...] | [...] | [...] | [...] | [...] | [...] | [...] | [...] |

| PRODUCT ID# | RELEASE DATE | AVAILABLE DATE | MSRP | VENDOR PRICE | PRICING DATE |
|---|---|---|---|---|---|
| 101 | 12/01/99 | 12/01/99 | $16,000 | $16,000 | 12/28/1999 |
| 102 | 06/01/00 | 05/01/00 | $1,100 | $1,100 | 4/30/2000 |
| [...] | [...] | [...] | [...] | [...] | [...] |
| 201 | 03/01/00 | 04/01/00 | $3,200 | $3,200 | 3/28/00 |
| [...] | [...] | [...] | [...] | [...] | [...] |

FIGURE 5

| CUST. ID# | CUST. NAME | PROD. ID# | DATE OF INDIC. | QTY | DATE OF RECONF. | SHIPPING INFO | BILLING INFO | CUST. HISTORY FACTOR | DATE SHIPPED | COM-MENTS |
|---|---|---|---|---|---|---|---|---|---|---|
| c001 | JOE SCHMOE | 101 | 11/28/99 | 2 | 12/28/99 | 11 WALKER DRIVE, NY, NY, 10000 | CREDIT CARD#, EXP. DATE | 54% | 01/07/00 | ...... |
| c002 | JODY SCHMOEE | 102 | 04/15/00 | 88 | 5/1/00 | 12 WALKER DRIVE, NY, NY, 10000 | CREDIT CARD#, EXP. DATE | 68% | 05/15/00 | ...... |
| [...] | [...] | [...] | [...] | [...] | [...] | [...] | [...] | [...] | [...] | [...] |
| c298 | JUDY SCHMOEI | 201 | 05/20/00 | 4 | 4/15/00 | 13 WALKER DRIVE, NY, NY, 10000 | CREDIT CARD#, EXP. DATE | 33% | 05/05/00 | ...... |
| [...] | [...] | [...] | [...] | [...] | [...] | [...] | [...] | [...] | [...] | [...] |
| [...] | [...] | [...] | [...] | [...] | [...] | [...] | [...] | [...] | [...] | [...] |

FIGURE 6

| | | |
|---|---|---|
| 405 | DEMAND PACKET ID#: | F2005 |
| 705 | DEMAND DESTINATION ID#: | DD04 |
| 205 | PRODUCT ID#: | 102 |
| 310 | PRICING DATE: | 4/30/00 |
| 805 | DEMAND SIZE: | 23 |
| 810 | CUSTOMER HISTORY FACTOR: | 62% |
| 815 | EXPECTED DEMAND: | 14 |
| 210 | VENDOR NAME: | ETHAN ALLEN |
| 215 | PRODUCT DESCRIPTION: | FURNITURE |
| 235 | PRODUCT MSRP: | $1,100 |
| 240 | PRODUCT PRICING MAX: | $2,000 |
| 245 | PRODUCT PRICING MIN: | $800 |
| 505 | PRODUCT VENDOR PRICE: | $1,100 |
| 305 | CONDITIONS OF INDICATION OF INTEREST: | |
| 310 | PRICING DATE: | 05/01/00 |
| 315 | MIN # INDICATIONS: | 25 |
| 320 | CONDITION 3: | [---] |
| 325 | CONDITION 4: | [---] |

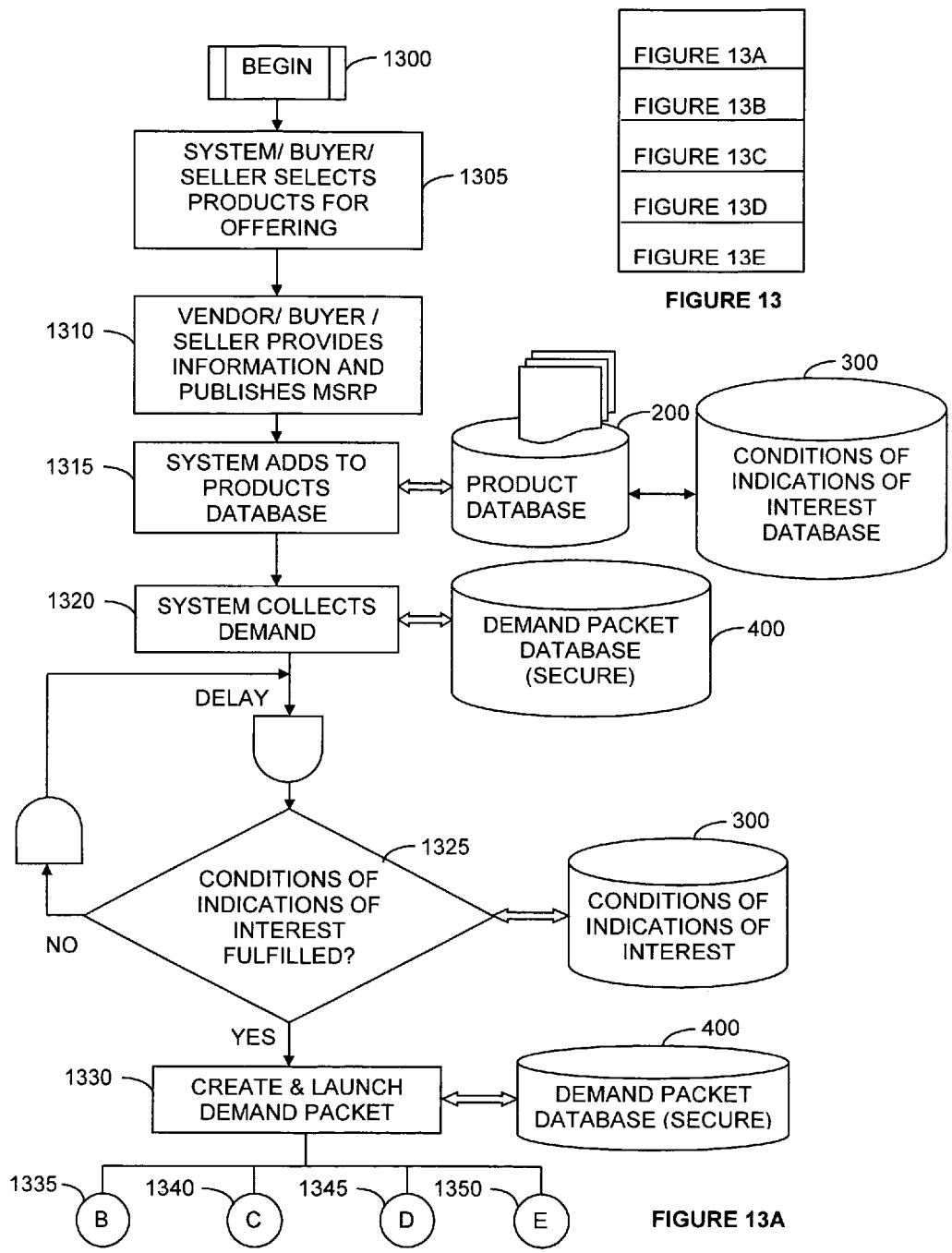

INITIAL PRODUCT OFFERING SYSTEM AND METHOD

CROSS REFERENCE TO RELATED APPLICATIONS

This application claims the benefit of U.S. patent application Ser. No. 09/649,224 filed on Aug. 25, 2000 now U.S. Pat. No. 7,103,565, which claims priority to U.S. Provisional Patent Application No. 60/150,993, filed on Aug. 27, 1999, the entire contents of both applications are incorporated herein by reference.

BACKGROUND OF THE INVENTION

1. Field of the Invention

The invention relates generally to digital commerce and specifically to the pricing and sale of products and services through a network based product offering using demand packets.

2. Description of Related Art

Individual buyers of both consumer and business related products and services (identified hereinafter as "singular customer") are at a disadvantage when making purchases because there is little negotiating leverage for a single sale. Large volume purchasers, on the other hand, have substantial leverage, such as when a retailer purchases goods from a wholesale supplier. There is a continuing need for a purchasing system that provides the leverage of large volume purchasing interest to singular customers, while disintermediating the sales chain of the product.

One approach to providing a solution for volume and predetermined pricing curve based system for the aggregation of purchasing interest is outlined in U.S. Pat. No. 6,047,266 entitled "Demand Aggregation through Online Buying Groups." This patent describes a method wherein an online buying group, referred to as a "co-op" is formed for the specific purpose of purchasing a particular product based on a predetermined pricing curve that is modified by the market data from the co-op. However, as significant disadvantages, (i) the seller has to disclose to the demand aggregation system its pricing curve which may be trade secret information instead of dynamically providing the pricing for the product, (ii) the system targets the co-op information to "a" particular vendor or manufacturer of the product, (iii) the system does not provide existing market-wide price transparency, and (iv) the system does not allow potential buyers to create their own said co-ops as the co-ops tend to be driven by the system and effectively by the pricing curve information provided by the vendor or the manufacturer.

Another approach to effectuating bilateral buyer-driven commerce through allowing prospective buyers to communicate a binding purchase offer globally to potential sellers, for sellers to conveniently search for potential buyer purchase offers, and for sellers to bind a buyer to its offer is outlined in U.S. Pat. No. 5,794,207, entitled "Method and Apparatus for a Cryptographically Assisted Commercial Network System Designed to Facilitate Buyer-Driven Conditional Purchase Offers." This patent describes a method and system whereby buyers can negotiate a purchase price of a product or service with a seller through an online bid-offer system. However, as a significant disadvantage, the patent does not create buying groups that have the ability of large volume discounts.

There remains the need for a digital commerce system that allows singular customers to create their own demand or purchasing interest pools, and routes these packets of demand ("demand packets") to a plurality of hosts comprising (i) multiple suppliers, vendors, manufacturers and distributors of the particular product or service, (ii) auction networks where these demand packets may represent both sell and buy-side entries, (iii) vertical exchanges where similar category of products and services are sold and brokered, and (iv) horizontal marketplaces where similar categories of products and services are sold and brokered. There also remains the need for this system to be available over a plurality of network access devices comprising mobile phones, mobile computers, personal computers, laptop computers, handheld computers, personal digital assistants, and handheld computers. The system should further provide optimal pricing for the products coupled with market-wide price transparency.

SUMMARY OF THE INVENTION

To overcome the problems of conventional demand and supply aggregation systems, the principles of the present invention provide for a method and for determining a price for a product. The method may include calculating an aggregate customer history factor by aggregating customer history factors of potential purchasers in a buying group. The customer history factors may include at least one of the following customer related parameters: customer rating parameter, customer transaction parameter, customer demographics parameter, customer geographics parameter, customer psychographic parameter, and customer behavioral parameter. The method further calculates a cumulative demand for a product as a function of (i) expected purchase quantities of the product indicated by the potential purchasers in the buying group and (ii) the aggregate customer history factor. A price of the product may be set as a function of the cumulative demand for the buying group.

The system and method of the invention will be more readily understood and apparent from the following detailed description of the invention when read in conjunction with the accompanying drawings, and from the claims, which are appended at the end of the detailed description.

BRIEF DESCRIPTION OF THE DRAWINGS

The foregoing will be appreciated more fully from the following further description thereof, with reference to the accompanying drawings, wherein:

FIG. 2 illustrates records in a product database;

FIG. 3 illustrates records in a conditions of indications of interest database;

FIG. 4 illustrates records in a demand packet database;

FIG. 5 illustrates records in a product pricing database;

FIG. 6 illustrates records in a customer sales database;

FIGS. 13A-13E are a flow chart of a system process in the product offering for group buying according to the invention;

DETAILED DESCRIPTION

To provide an overall understanding of the invention, certain illustrative embodiments will now be described, including demand packets and a system and method for group buying using same demand packets. However, it will be understood by those of ordinary skill in the art that the demand packet may be adapted to other forms, physical and virtual, provided they are capable of including the necessary demand packet parameters described below. It will also be understood that the methods and systems described herein can be suitably adapted to any other sales model where a customer can make an indication of interest while reconfirming based on trigger events, such as, for example, reconfirm automatically if the price of the product is in the given range. The terms "product" and "item" are used interchangeably herein to denote products of all kinds comprising products, services, consumer products, and solutions in all physical and abstract forms. The terms "customer", "purchaser", and "operator" are used interchangeably herein to denote a potential buyer, which places an indication of interest to purchase the given product.

Overview of System

Figure 1:
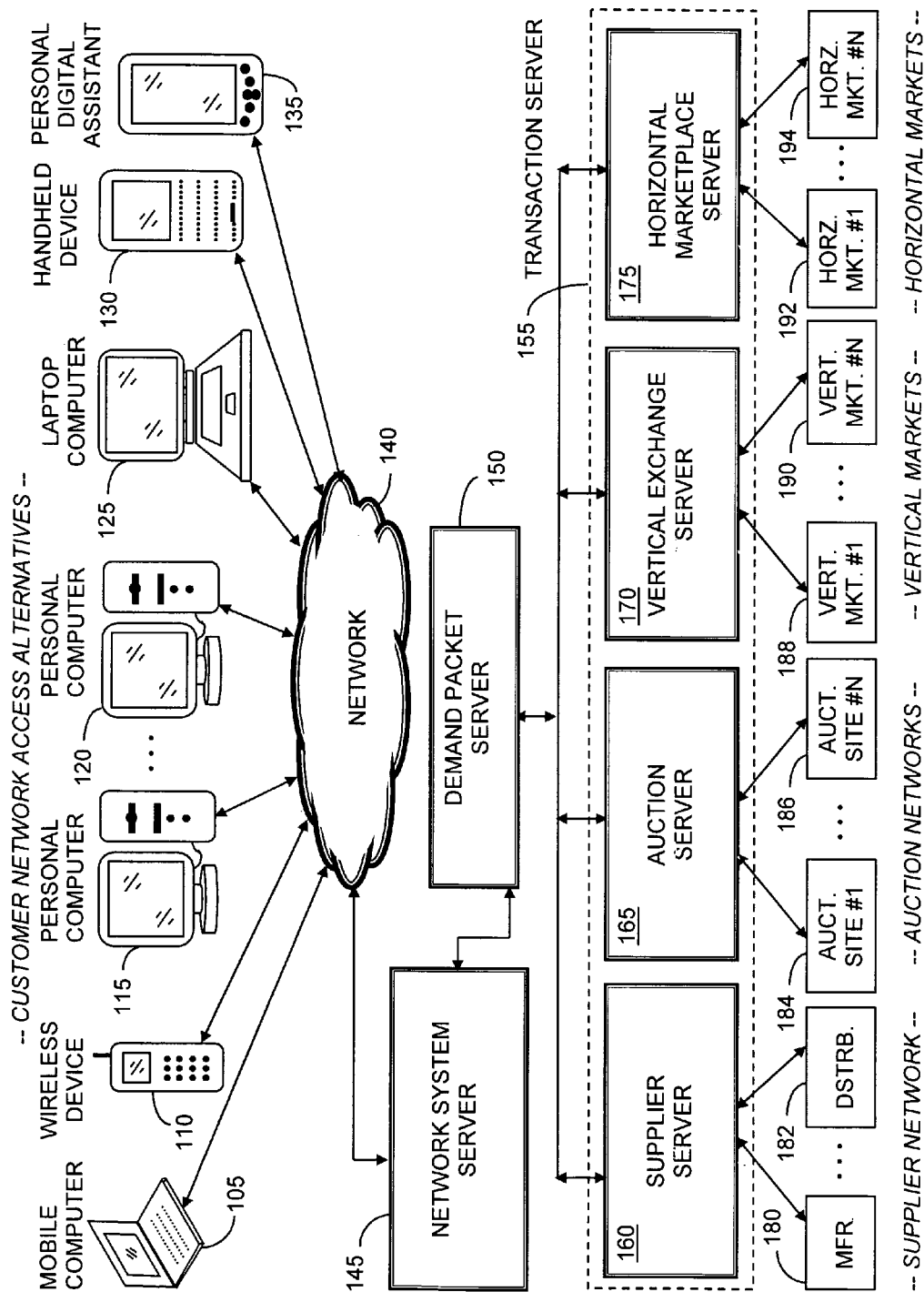
FIG. 1 is an abstract diagram of a system for group buying according to the invention.

FIG. 1 shows a preferred embodiment of a system 100 in accordance with the present invention, where a mobile computer user 105, wireless device user 110, personal computer user 115, personal computer user 120, laptop computer user 125, handheld device user 130, and personal digital assistant user 135 (collectively, the "User") through a network 140 such as the Internet connects to a network system server 145, which is in direct communications with a demand packet server 150. The demand packet server 150 is further in direct communications with a transaction server 155 comprising four servers: a supplier server 160, an auction server 165, a vertical exchange server 170, and a horizontal marketplace server 175. The supplier server 160 is further in direct communications with a plurality of suppliers for the product comprising manufacturers 180 and distributors 182. The auction server 165 is further in direct communications with a plurality of auction venues, where the demand packet may be auctioned, comprising auction site #1 184 and auction site #N 186. The vertical exchange server 170 is further in direct communications with a plurality of vertical exchanges for the product comprising vertical exchange #1 188 and vertical exchange #N 190. The horizontal marketplace server 170 is further in direct communications with a plurality of horizontal marketplaces for the product comprising horizontal marketplace #1 192 and horizontal marketplace #N 194. Generally, the configuration of the system 100 allows the network system server 145 to present the User with product information on a specific product offering in a computer searchable form and the ability for the User to create a new product offering through the system.

As will be discussed in more detail below, the User can select a product offering through the network system server 145 and place an indication of interest. The network system server 145 collects additional indications of interest in the same product offering while pre-determined conditions are fulfilled (e.g., time frame for the product offering). After suspension of the collections of the indications of interest for the product offering, the network system server 145 transmits the indications of interest to the demand packet server 150. The demand packet server 150 processes the received information and communicates with the transaction server 155. Based on the indications of interest transmitted by the demand packet server 150 in the form of demand packets and certain pre-determined conditions of the product offering, the transaction server 155 presents to the User via the demand packet server 150 and the network system server 145, offers from one or more product fulfillment destinations for the specific product offering.

In the communicating relationship, the network system server 145 collects reconfirmation at the offer price for all the Users that had previously placed an indication of interest in the specific product offering. Upon receiving the reconfirmations, the system 100 negotiates the offer price with the plurality of fulfillment destinations that had presented the offer, selects the final offer price, the transaction server 155 reaffirms the offer price and notifies the User via the demand packet server 150 and the network system server 145, regarding parameters for consummating the purchase transaction (e.g., physical shipping of the product, electronic delivery of the service).

Software Databases

A product database 200 stores product parameters for a plurality of product offerings. As shown in FIG. 2, the product database 200 stores a plurality of records 250, each record including a plurality of fields, the plurality of fields comprising: a product identifier 205 uniquely identifying the product in the product offering, the vendor name 210 identifying the manufacturer of the product, the product name 215 identifying the name of the product, the product description 220 identifying the description of the product, the release date 225 identifying the date on which the product will be released into the market, the available date 230 identifying the date on which the product will be available through the system 100, the MSRP 235 identifying the manufacturer's retail price for the product, the pricing range max 240 identifying the maximum price of the product for the product offering, and the pricing range min 245 identifying the minimum price of the product for the product offering. For example, referring to record 255, the product 101, which is an automobile is manufactured by Ford and termed Toy 2000. Furthermore, this record 255 indicates that the release date of the product is December 1999 and its available date on the system 100 is December 1999 as well. The manufacturers retail price for the product is $20,000, its maximum range is $20,000 and its minimum pricing range is $14,000.

A conditions of indications of interest database 300 stores the conditions upon which the product offering shall be conducted for the product. As shown in FIG. 3, the conditions of indications of interest database 300 stores a plurality of records 330, each record including a plurality of fields, the plurality of fields comprising: a product identifier 205 uniquely identifying the product in the product offering, the conditions of indications of interest 305 comprising: the pricing date 310 identifying the date on which the product offering will be priced, the min # indications 315 identifying the minimum number of indications of interest that will be received to conduct the product offering, and other conditions 320 and 325 as may be deemed appropriate by the creator of the product offering. For example. referring to record 335, the product 101 will be priced on Dec. 1, 1999 if at least 10 indications of interest to purchase the product are received by the system 100.

A demand packet database 400 stores the parameters that form a demand packet for each product offering. As shown in FIG. 4, the demand-packet database 400 stores a plurality of records 415, each record including a plurality of fields, the plurality of fields comprising: a demand-packet identifier 405 uniquely identifying the demand packet, the demand packet destination identifier 705 uniquely identifying the pre-determined fulfillment destinations where the demand packet is to be routed, the product identifier 205 identifying the product for which the demand packet has been created, the customer identifier 605 identifying the customer indicating the demand for the given demand packet, the indication date 615 identifying the date on which the demand was indicated by the customer into the demand packet database, the quantity 620 identifying the number of items of the product which are sought, the cumulative demand size 410 identifying the cumulative size of the demand, the customer history factor 635 identifying the average purchase rate of the customer, and the pricing date 310 identifying the date on which the product offering will be priced. For example, referring to record 420, the demand packet A2004 has a demand destination of DD20 and the packet is being created for a product 123 where an indication of interest is placed on Apr. 15, 2000 by customer C002 with a customer history factor of 68% for a quantity of 2 items. At this record 420, the cumulative demand size for the product offering is 2 and the offering will be priced on Jun. 22, 2000.

A product pricing database 500 stores, for each product offering, the pricing date along with the final offer from the fulfillment destination on the pricing date. As shown in FIG. 5, the product pricing database 500 stores a plurality of records 510, each record including a plurality of fields, the plurality of fields comprising: a product identifier 205 uniquely identifying the product in the product offering, the release date 225 identifying the date on which the product will be released into the market, the available date 230 identifying the date on which the product will be available through the system 100, the MSRP 235 identifying the manufacturer's retail price for the product, the vendor price 505 identifying the final offer price from the fulfillment destination that is selected in conjunction with fulfilling the purchase transaction for the product offering, and the pricing date 310 identifying the date on which the product offering will be priced. For example, referring to record 515, the product 101 will be priced on Dec. 28, 1999 at a vendor price of $16,000.

A customer sales database 600 stores, for each customer, the details of interaction with the system 100 for specific product offerings. As shown in FIG. 6, the customer sales database 600 stores a plurality of records 655, each record including a plurality of fields, the plurality of fields comprising: a customer identifier uniquely identifying the customer, the customer name, the product identifier 205 uniquely identifying the product in the product offering, the date of indication 615 identifying the date on which the customer placed the indication of interest for the product offering, the quantity 620 identifying the number of items the indication of interest is being placed for, the date of reconfirmation 625 identifying the date on which the customer reconfirmed its indication of interest, the shipping info 630 identifying the address the product is being shipped, the billing info 635 identifying the method of payment for the product, the customer history factor identifying the average purchase rate of the customer for past product offerings, the date shipped 645 identifying the date on which the product was shipped to the customer, and the comments 650 on interactions with the customer. For example, referring to record 660, the customer cO01 identified as Joe Schmoe placed an indication of interest of 2 items for product 101 on Nov. 28, 1999 and reconfirmed the indication of interest on Dec. 28, 1999. Referring further to record 660, the customer cO01 asked for the product to be sent to 11 Walker Drive, New York, NY 10000, provided a credit card # as his preferred method of payment where the product was shipped on Jan. 7, 2000. Referring further to record 660, the customer c001 has a customer history factor of 54%, and there have been interactions with the customer.

Figure 7:
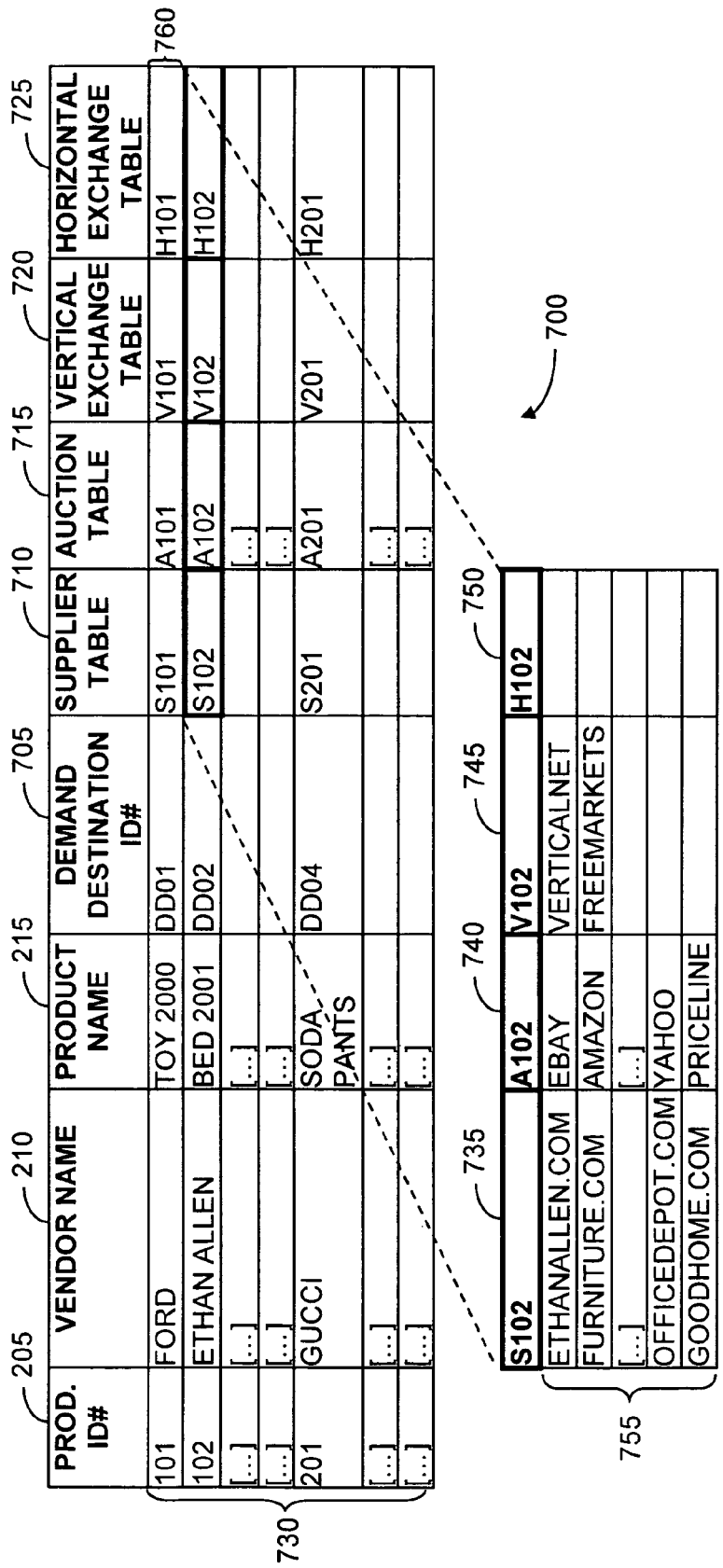
FIG. 7 illustrates records in a product network. database.

A product network database 700 stores, for each product, the network of preferred and pre-determined fulfillment destinations for specific product offerings. As shown in FIG. 7, the product network database 700 stores a plurality of records 730, each record including a plurality of fields, the plurality of fields comprising: a product identifier 205 uniquely identifying the product in the product offering, the vendor name 210, the product name 215, the demand destination identifier 705 uniquely identifying the preferred and pre-determined fulfillment destinations for the product in the product offering, the supplier table 710 that stores a plurality of records 755, each record including a plurality of fields, the plurality of fields comprising: S102 735 identifying the electronic addresses of the preferred and pre-determined fulfillment destinations in the supplier category, the auction table 715 that stores a plurality of records 755, each record including a plurality of fields, the plurality of fields comprising: A102 740 identifying the electronic addresses of the preferred and pre-determined fulfillment destinations in the auction category, the vertical exchange table 720 that stores a plurality of records 755, each record including a plurality of fields, the plurality of fields comprising: V102 745 identifying the electronic addresses of the preferred and pre-determined fulfillment destinations in the vertical exchange category, and the horizontal marketplace table 725 that stores a plurality of records 755, each record including a plurality of fields, the plurality of fields comprising: H102 735 identifying the electronic addresses of the preferred and pre-determined fulfillment destinations in the horizontal marketplace category. For example, referring to record 760, for product 101 with the name Toy 2000 to be supplied by Ford, the demand destination identifier is DD01 which is sent to pre-determined fulfillment destinations S102 for the supplier category, A102 for the auction category, V102 for the vertical exchange category, and H102 for the horizontal marketplace category.

The Demand Packet

Figure 8:
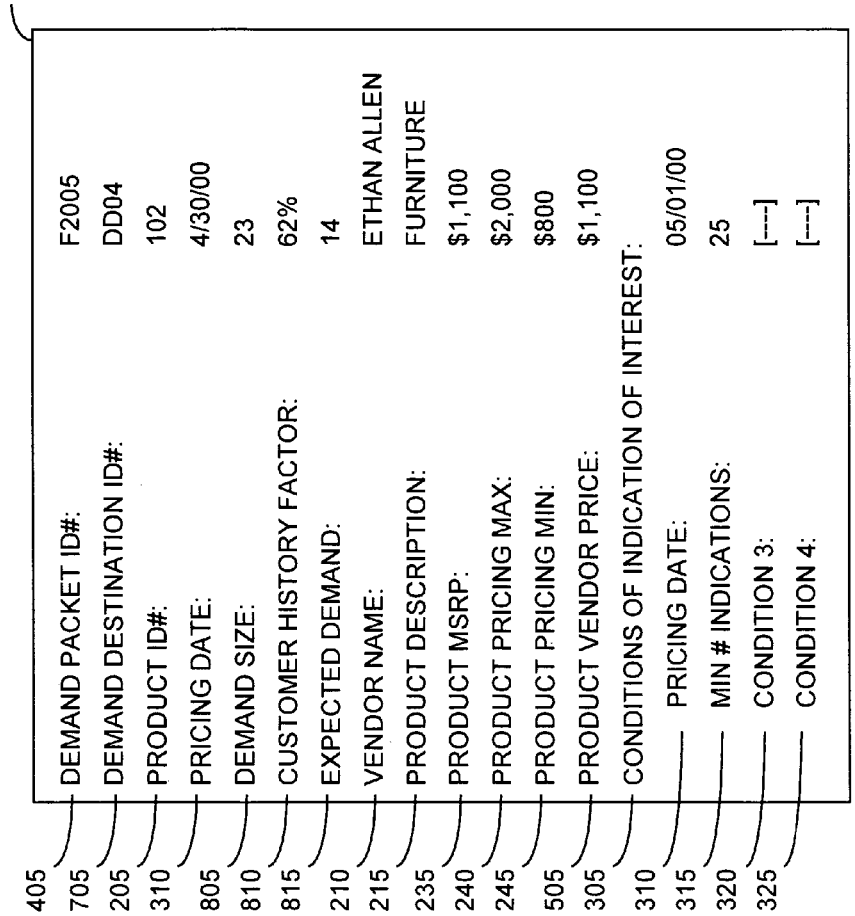
FIG. 8 shows the description of the demand packet.

FIG. 8 shows a preferred embodiment of the demand packet 800, which is created by the demand packet server 150 from the network based aggregated information collected by the network system server 145. The demand packet 800 is utilized by the demand packet server 150 to communicate with the transaction server 155 and its sub servers in order to consummate the purchase transaction. Each demand packet 800 stores a plurality of relevant records comprising: the demand packet identifier 405, the demand destination identifier 705, the product identifier 102, the pricing date 310, the demand size 805 uniquely identifying the cumulative size of the demand collected through all the indications of interest times the quantity 620 in the demand packet database 400, the customer history factor 810 identifying the average purchase rate of all the customers that placed indications of interest for the product offering, the expected demand 815 identifying the multiplication of the demand size 805, and the customer history factor 810, the vendor name 210, the product description 215, the product MSRP 235, the product pricing max 240, the product pricing min 245, the product vendor price 505, and the conditions of indication of interest 305 based upon which the potential customers had placed their indication of interest further comprising: the pricing date 310, the min # indications 315, the condition 3 320, and the condition 4 325.

Hardware Servers

Figure 9:
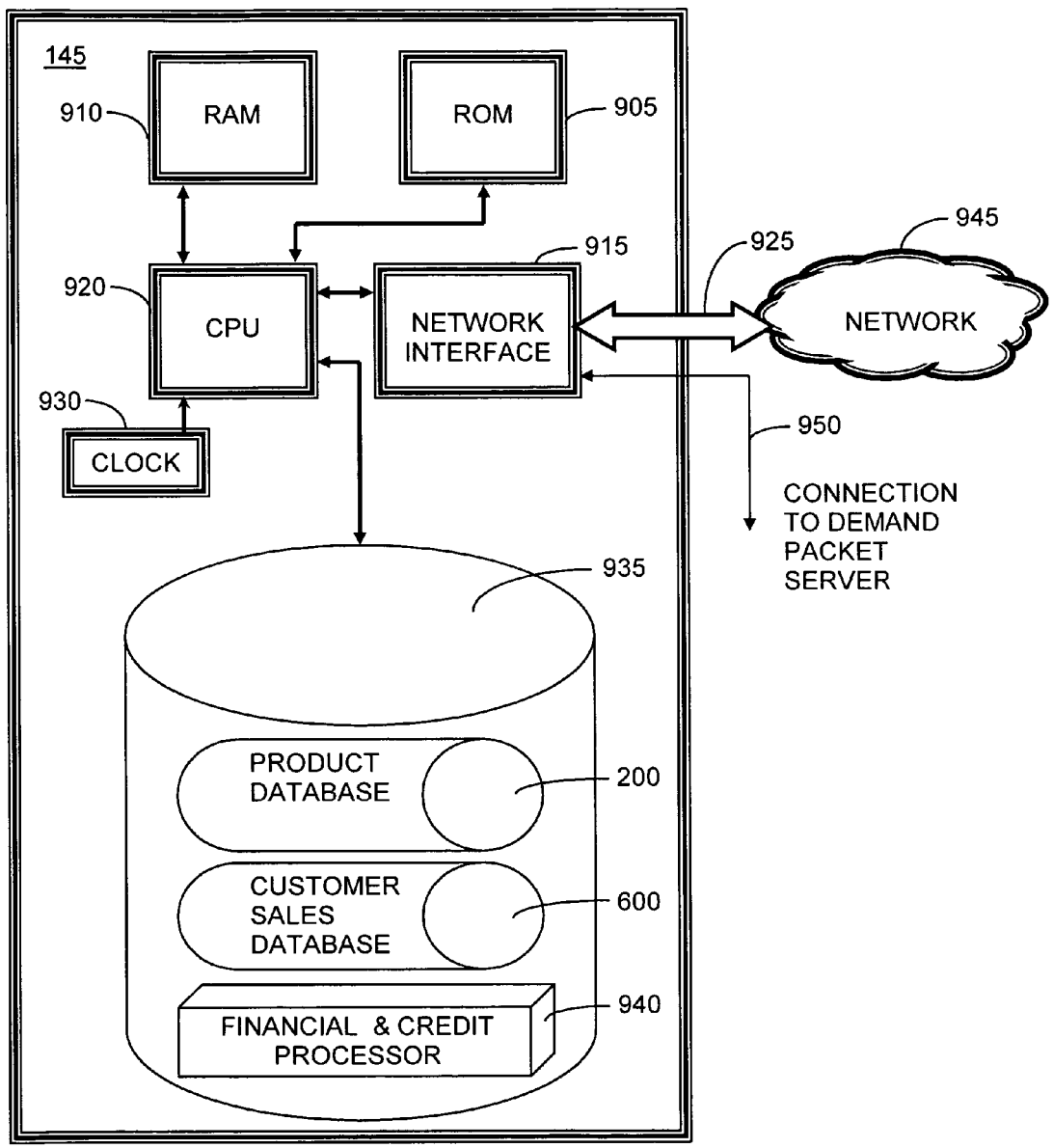
FIG. 9 is a block diagram of a network system server.

FIG. 9 is a block diagram of a network system server 145. The network system server 145 includes a processor 920, and connected thereto, a random access memory 910, a read-only memory 905, a network card 915, a system clock 930, and a storage device 935. The network card 915 can be any network card capable of handling numerous logical connections 925 to a network 945, as required by the number of customers, fulfillment destinations, financial transaction processors, and logical connections 950 to the demand packet server requiring resources from the network system server 145. The storage device 935 can be any storage device capable of maintaining a product database 200, a customer sales database 600, and financial and credit processor 940, such as a hard drive, storage area network, redundant array of inexpensive disks, or other mass storage device. If the databases 200, 600 on the storage device 935 are particularly large, a separate transaction processor may be provided to off-load database management from the processor 920. The processor 920 and memories 910, 905 may be any processor and memories known in the art that are consistent with the volume of traffic handled by the network card 915, including any associated security protocols, and the volume of data stored in the storage device 935. Suitable network servers are manufactured by Compaq Computers, Dell, IBM, and Sun MicroSystems. Such servers may employ a processor with multiple central processing units, and will operate under control of an operating system such as Unix, Linux, other Unix variants, DOS, Windows or its variants, VMS, and Solaris. The network system server 145 will also run additional programs or software modules from the operating system to control server operations, web server operations, authentication functions, network security, and database management, many alternatives for which are known in the art and commercially available. The invention may be usefully practiced with any of these computers, operating systems, and other programs. The software modules will also provide and operate a web site provided by the network system server 145 for the customers, according to information stored on the storage device 935.

Figure 10:
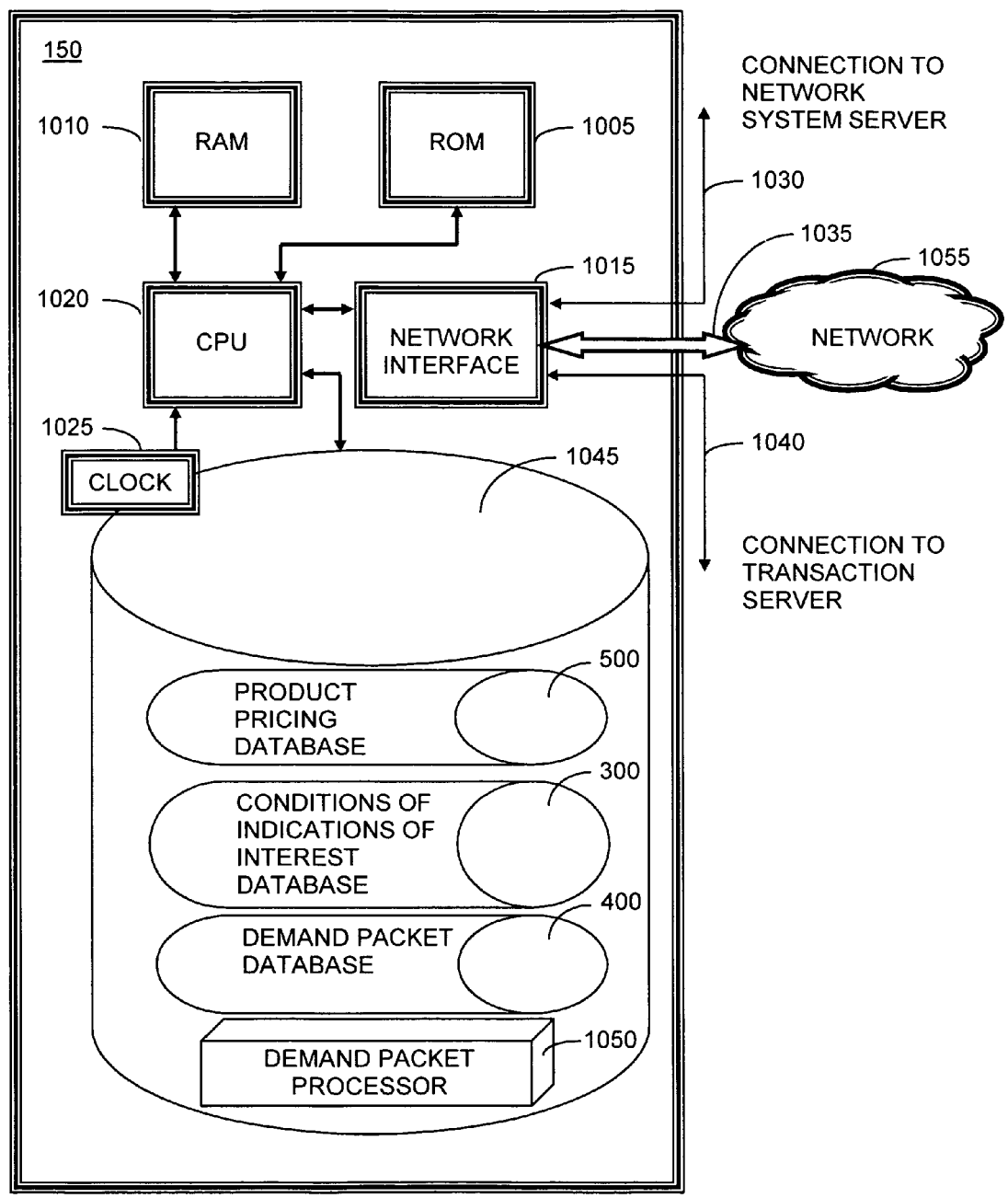
FIG. 10 is a block diagram of a demand packet server.

FIG. 10 is a block diagram of a demand packet server 150. The demand packet server 150 includes a processor 1020, and connected thereto, a random access memory 1010, a read-only memory 1005, a network card 1015, a system clock 1025, and a storage device 1045. The network card 1015 can be any network card capable of handling numerous logical connections 1035 to a network 1055, as required by the number of customers, fulfillment destinations, demand packet processors, logical connections 1030 to the network system server 145, and logical connections 1040 to the transaction server 155 requiring resources from the demand packet server 150. The storage device 1045 can be any storage device capable of maintaining a product pricing database 500, a conditions of indications of interest database 300, a demand packet database 400, and a demand packet processor 1050, such as a hard drive, storage area network, redundant array of inexpensive disks, or other mass storage device. If the databases 300, 400, 500 on the storage device 1045 are particularly large, a separate transaction processor may be provided to off-load database management from the processor 1020. The processor 1020 and memories 1010, 1005 may be any processor and memories known in the art that are consistent with the volume of traffic handled by the network card 1015, including any associated security protocols, and the volume of data stored in the storage device 1045. Suitable network servers are manufactured by Compaq Computers, tell, IBM, and Sun MicroSystems. Such servers may employ a processor with multiple central processing units, and will operate under control of an operating system such as Unix, Linux, other Unix variants, DOS, Windows or its variants, VMS, and Solaris. The demand packet server 150 will also run additional programs or software modules from the operating system to control server operations, web server operations, authentication functions, network security, demand packet processing and database management, many alternatives for which are known in the art and commercially available. The invention may be usefully practiced with any of these computers, operating systems, and other programs.

Figure 11:
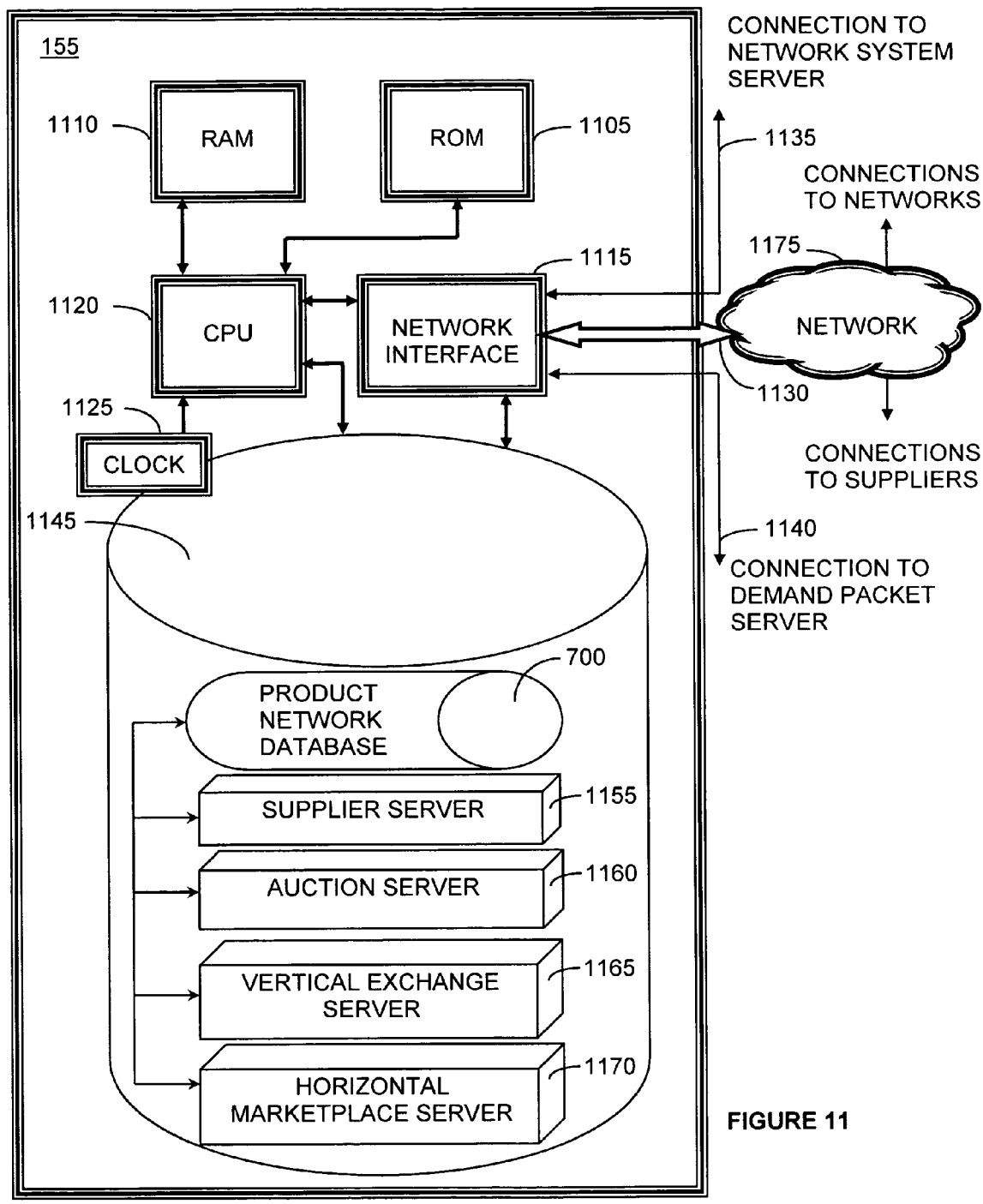
FIG. 11 is a block diagram of a transaction server.

FIG. 11 is a block diagram of a transaction server 155. The transaction server 155 includes a processor 1120, and connected thereto, a random access memory 1110, a read-only memory 1105, a network card 1115, a system clock 1125, and a storage device 1145. The network card 1115 can be any network card capable of handling numerous logical connections 1130 to a network 1175, as required by the number of customers, fulfillment destinations, and transaction processors 1155, 1160, 1165, 1170, logical connections 1135 to the network system server 145, and logical connections 1140 to the demand packet server 150 requiring resources from the transaction server 155. The storage device 1145 can be any storage device capable of maintaining a product network database 700, a supplier processor/server 1155, an auction processor/server 1160, a vertical exchange processor/server 1165, and a horizontal marketplace processor/server 1170, such as a hard drive, storage area network, redundant array of inexpensive disks, or other mass storage device. If the database 700 on the storage device 1145 are particularly large, a separate transaction processor may be provided to off-load database management from the processor 1120. The processor 1120 and memories 1110, 1105 may be any processor and memories known in the art that are consistent with the volume of traffic handled by the network card 1115, including any associated security protocols, and the volume of data stored in the storage device 1145. Suitable network servers are manufactured by Compaq Computers, Dell, IBM, and Sun MicroSystems. Such servers may employ a processor with multiple central processing units, and will operate under control of an operating system such as Unix, Linux, other Unix variants, DOS, Windows or its variants, VMS, and Solaris. The transaction server 155 will also run additional programs or software modules from the operating system to control server operations, web server operations, authentication functions, network security, fulfillment processing, and database management, many alternatives for which are known in the art and commercially available. The invention may be usefully practiced with any of these computers, operating systems, and other programs.

Method of Operation

An embodiment of the process for the system 100 described above will now be described in detail by reference to FIGS. 12A-12B and FIGS. 13A-13E.

Customer Process

Figure 12A:
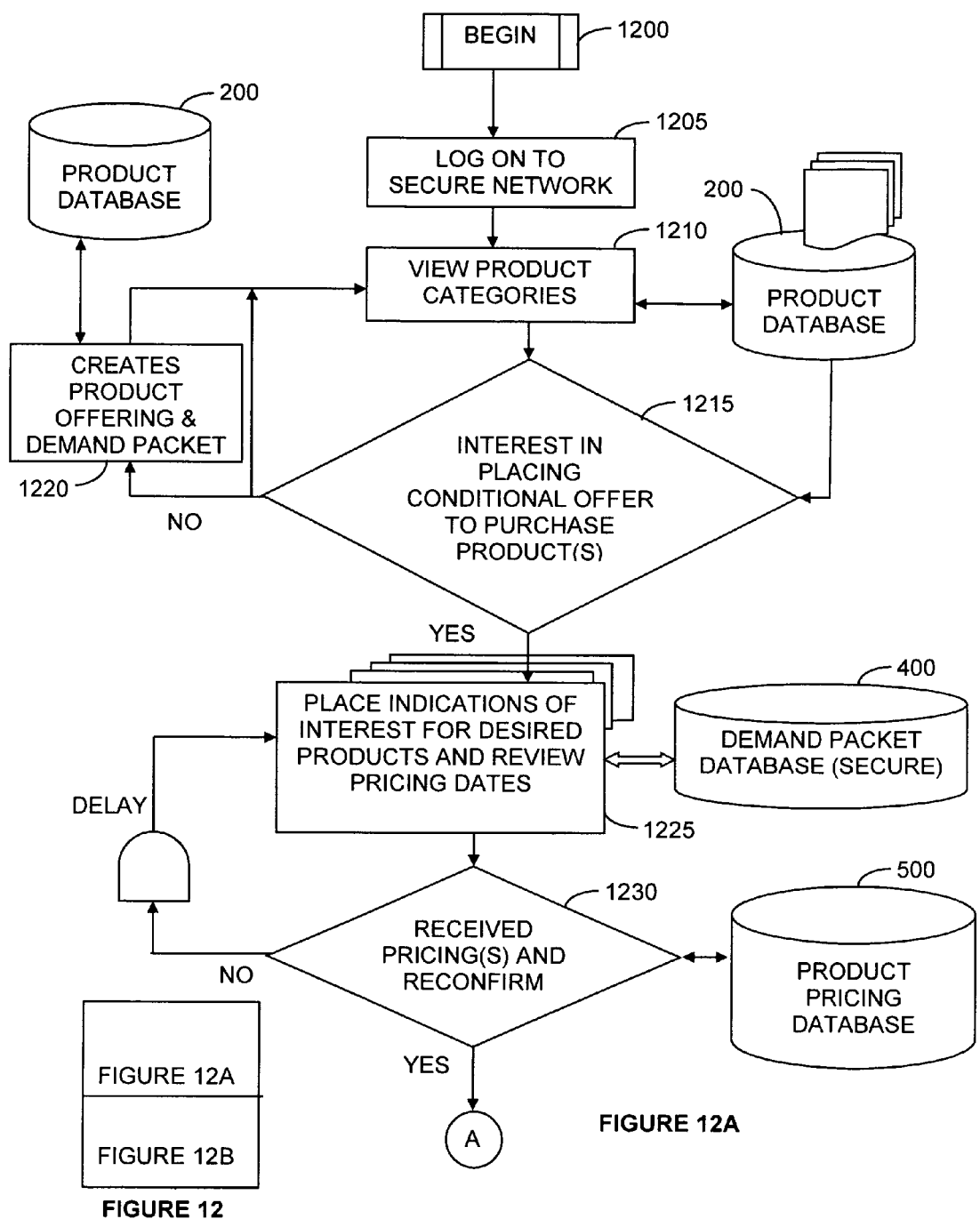
FIGS. 12A-12B are a flow chart of a customer process in the product offering for group buying according to the invention.
Figure 12B:
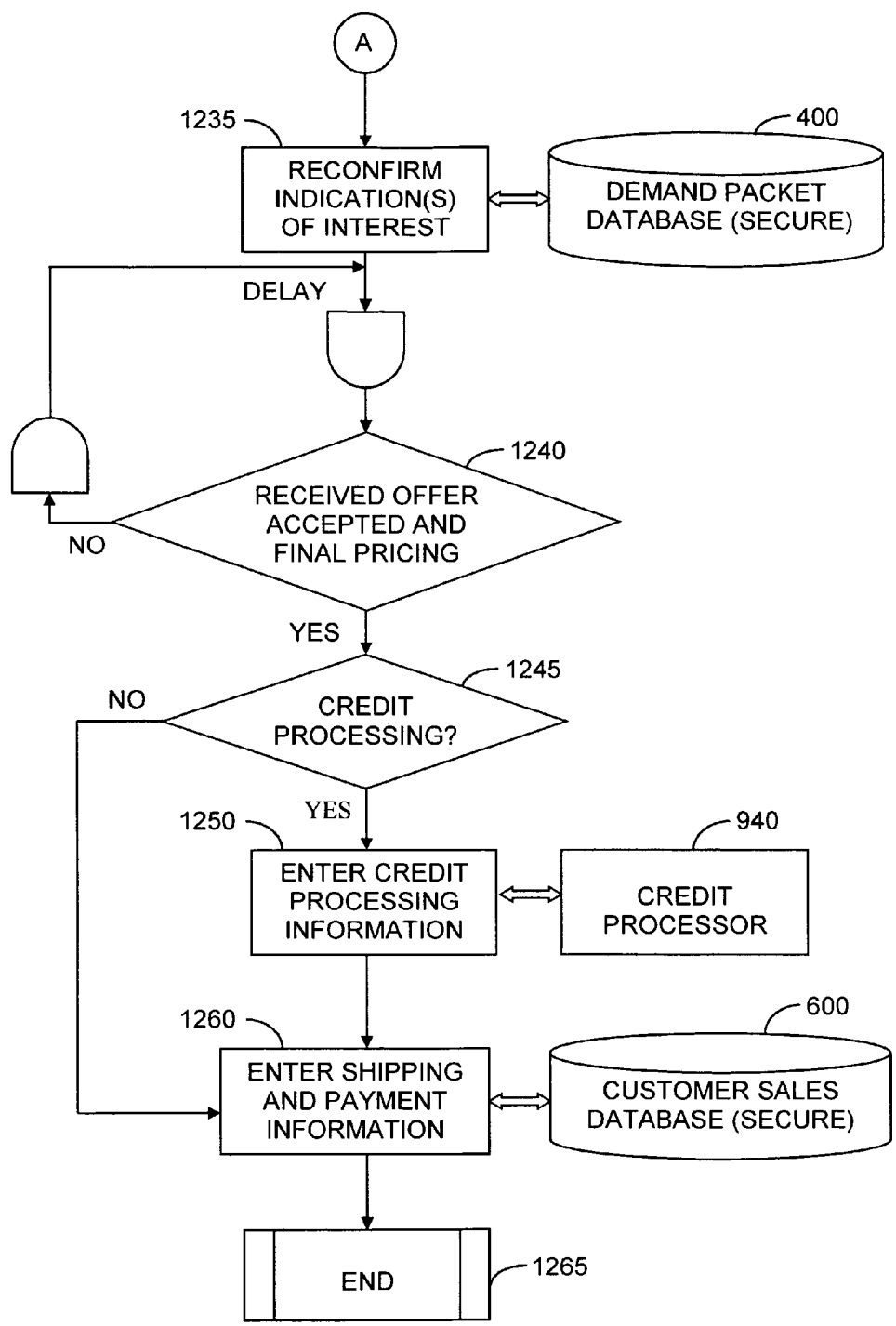
Figure 13B:
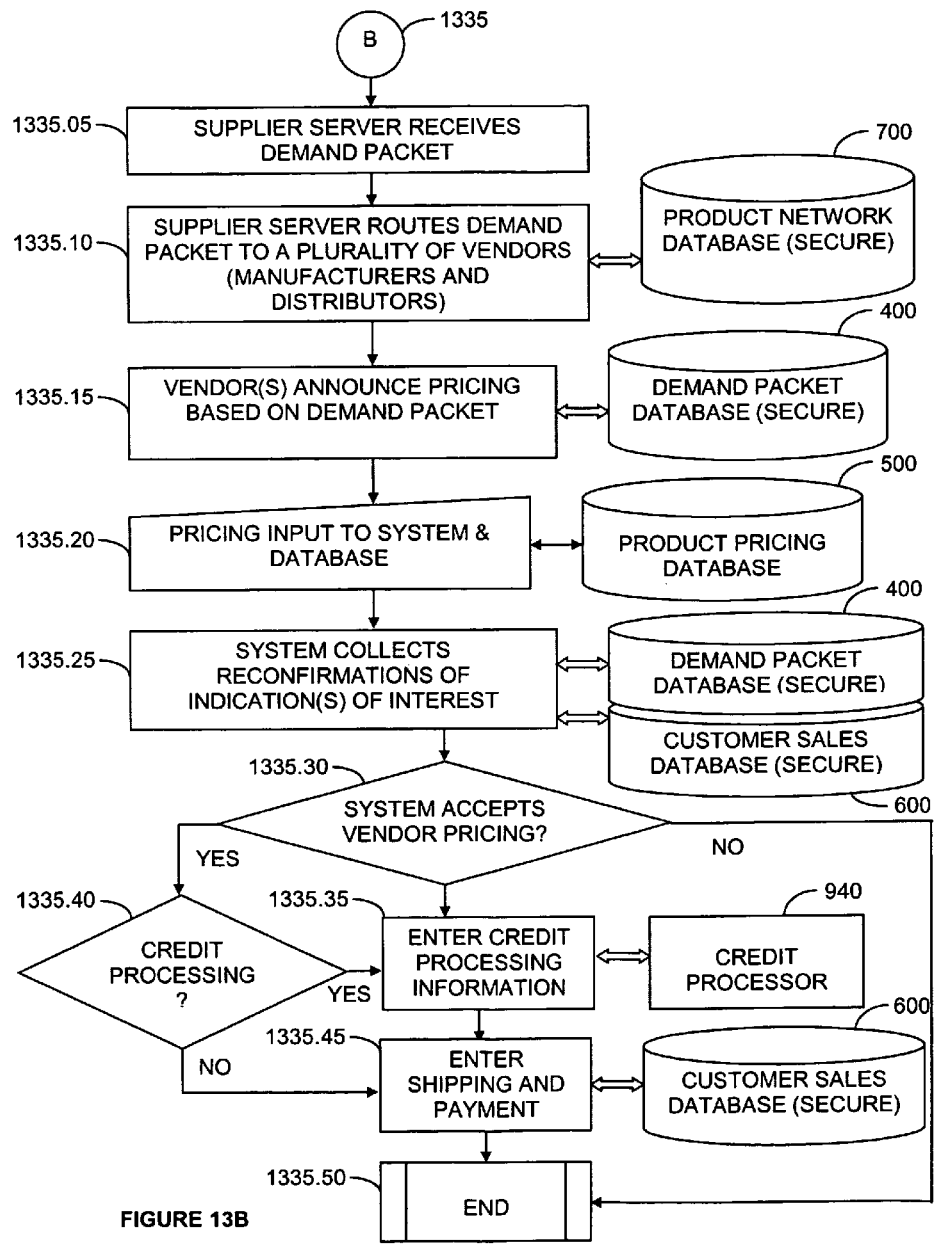
Figure 13C:
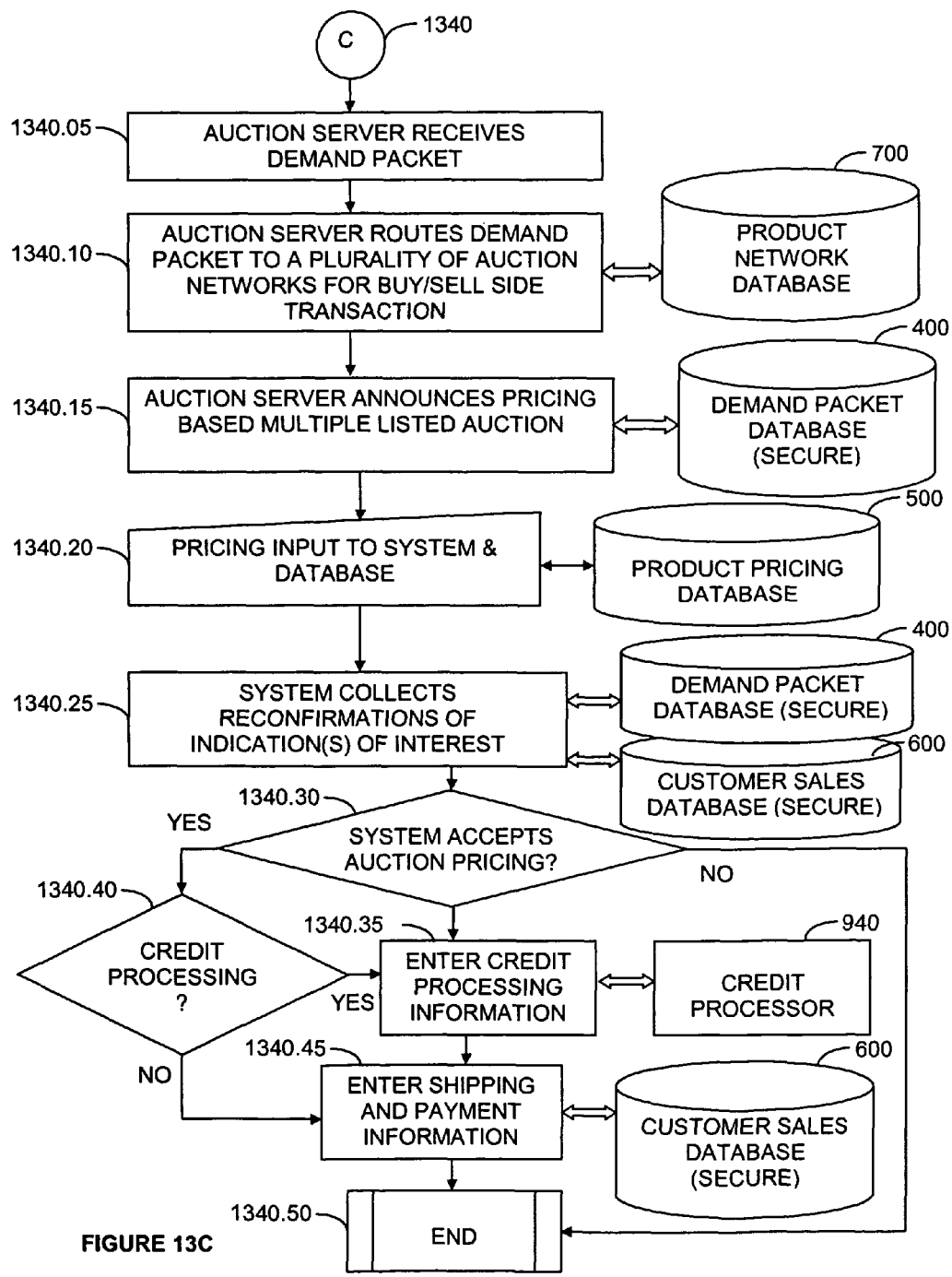
Figure 13D:
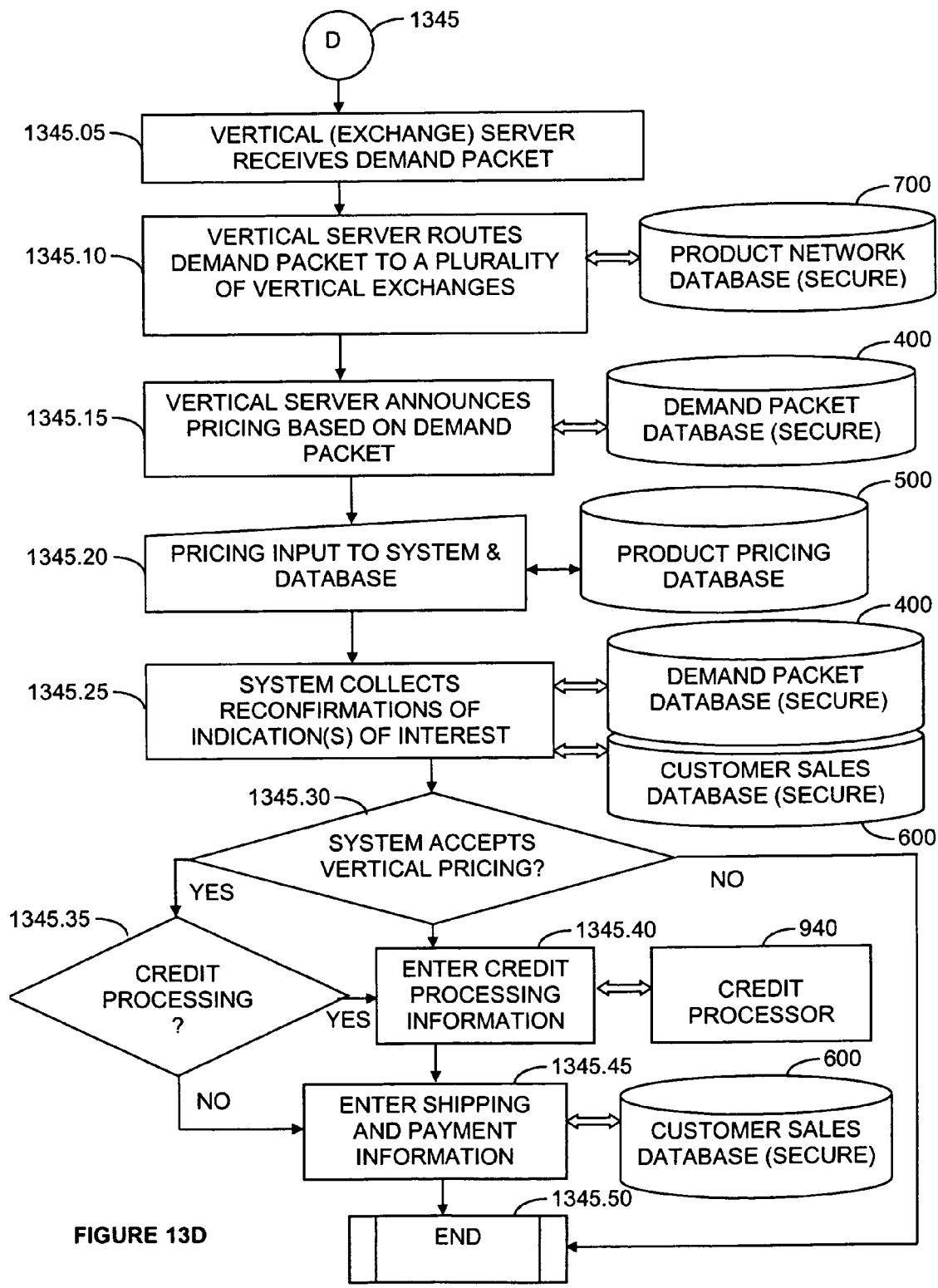
Figure 13E:
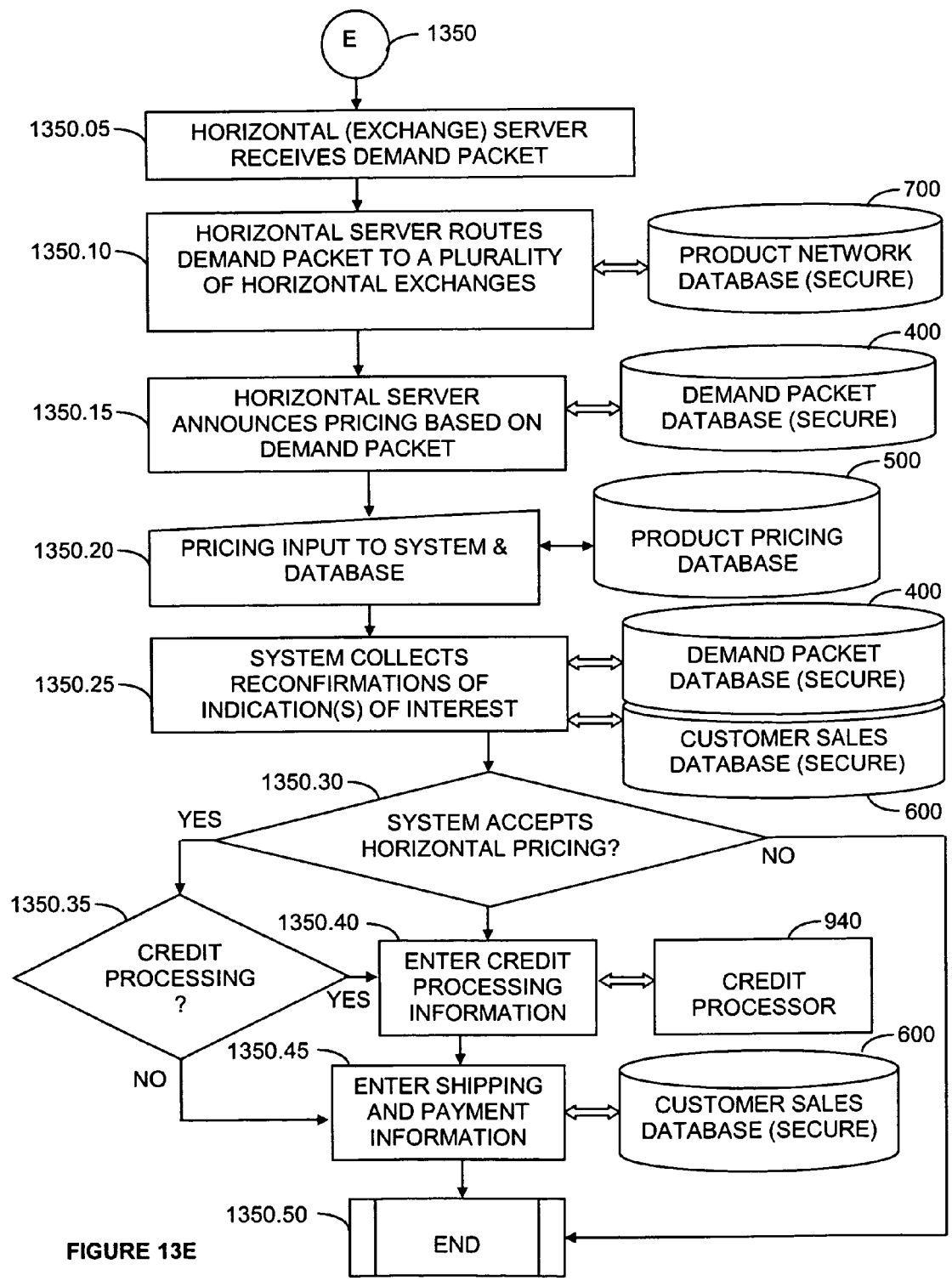

FIGS. 12A-12B are flow charts showing a customer's interaction process 1200 with the system 100 for group buying according to the invention, which also shows the resources used for each step. The customer process 1200 begins when the customer logs on to a secure web site 1205 that is provided by the network system server 145. Once the customer is logged on to the system 1205, the customer interactively browses lists of available product categories 1210, each product category identifying an offering for that product from the associated product database 200, for product offerings that may be of interest to the customer. The network, system server 145 maintains communication with the product database 200, which is periodically updated to add and remove product offerings. All web server communications are secure, such as through the secure socket layer (SSL) communications through digital encryption identifications through commercially available services such as Verisign.

After the customer has had a chance to view the product categories and select a desired product 1210, the customer is asked if there is an interest in placing a conditional indication of interest in purchasing the product as part of an offering group 1215. This entails two options 1215: (1) no interest in placing an indication of interest wherein the customer has an option to create their own product offering for a specific product 1220 and then view product categories to select the product 1210, or view product categories once again to select a desired product 1210, and (2) place indication of interest for the desired product 1225 which is entered into the secure demand packet database 400, and, if the offering is still open, the customer receives e-mail confirmation of the accepted indication of interest. Indications of interest to purchase an item are aggregated into a group, along with available information about customers, such as their histories of purchasing through the demand packet server. This group information is then used to negotiate a group purchase price with potential fulfillment destinations. The negotiation may occur through human interaction between the web provider and the fulfillment destinations, or may occur using a pre-determined protocol between the web server and a remote server operated by the fulfillment destinations. During the entire negotiation process, the customer waits for receiving the offer from one fulfillment destination or multiple offers from a plurality of fulfillment destinations 1230. Once a price is negotiated, each customer who indicated an interest to purchase receives an e-mail detailing the offer 1230. The offer is sent to the customer in accordance with the offer entry in the product pricing database 500. At this point, the customer may accept the offer and proceed with a purchase transaction, or the customer may reject the offer. If the customer chooses to accept the offer(s), the customer is required to reconfirm the offer(s) within a specified amount of time as indicated in the customer's offer e-mail 1235. The reconfirmation process 1235 is conducted in accordance with information exchange between the network system server 145, the demand packet server 150, and the demand packet database 400. Where an offer is rejected by one or more customers, this information may optionally be stored and used to attempt another round of price negotiation. After the specified time frame, the reconfirmations are updated in the demand packet database 400 for the entire group that had previously placed an indication of interest. The reconfirmations may be of multiple nature meaning that one customer may reconfirm for multiple offers that he may have received from a plurality of fulfillment destinations. The aggregate reconfirmation group information is re-presented to the fulfillment destinations that had provided the offer, and the final offer price from one or more fulfillment destinations is provided to the customers 1240. At this point, if the customer desires credit processing 1245, the customer is required to enter credit processing information 1250 that is exchanged with a credit processor 940 for the purposes of providing a credit solution to the customer. In the following step, the customer is required to enter product delivery information such as the shipping information 1260 which is updated into the customer sales database 600 which marks the completion of the purchase transaction 1265 on the system 100.

FIGS. 13A-13E are flow charts showing a system process 1300 for group buying according to the invention, which also shows the resources used for each step. The system process 1300 begins when a user, comprising a customer or one of the plurality of fulfillment providers, logs on the system. If the user is one of the plurality of fulfillment providers, the web site offers two options: (1) to view an existing demand packet, as will be discussed later, and (2) create a new product offering. To create a new product offering. the fulfillment destination selects products 1305 and provides product specific information 1310 including a manufacturer suggested retail price (MSRP), a range of offering prices, conditions for the offering, and a time period for the offer. Once an interested user has provided the required information, a product listing may be added 1315 to the product database 200, and the conditions of indication of interest to be added to the conditions of indication of interest database 300. The system 100 then interacts with customers and collects the indications of interest 1320 as described above until any conditions of indication of interest set forth by the fulfillment destination have been satisfied 1325. In step 1320, the system 100 exchanges the customer specific information with the demand packet database 400. In step 1325, the system 100 exchanges the indication of interest information with the conditions of indication of interest database 300. If the fulfillment destination's conditions have not been satisfied by the pricing date, the fulfillment destination may change the conditions. At this point, the system 100, in accordance with the demand packet database 400, creates a demand packet 1330. Depending on the preferred and pre-determined fulfillment destinations for the demand packet, the demand packet may be routed to one or more of fulfillment processes including: a supplier process for a plurality of supplier destinations 1335, an auction process for a plurality of auction destinations 1340, a vertical exchange process for a plurality of vertical exchange destinations 1345, and a horizontal marketplace process for a plurality of horizontal marketplace destinations 1350.

In the supplier process 1335, the supplier server 1155 receives the demand packet 1335.05 and routes the demand packet to a plurality of supplier category fulfillment destinations 1335.10 prior to which the supplier server 1155 secures routing information from the product network database 700 and vice versa. Based on the information contained in the demand packet and the aggregated indications of interest obtained through the demand packet database 400, one or more supplier category fulfillment destinations announce the offers which includes the pricing 1335.15. The offers are entered into a product pricing database 500, and the pricing information is e-mailed to participating customers for reconfirmation 1335.20. In a finite time frame, the system 100 collects reconfirmations from the customers that had placed an indication of interest 1335.25, and this information is provided for in the demand packet database 400 and the customer sales database 600. It should be noted that one customer may, for one previously entered indication of interest, submit multiple reconfirmations to one or more of the offers received from the system 100. Upon transmitting the reconfirmations to all the supplier category fulfillment destinations that had made an offer based on the demand packet, the pricing is confirmed by the system 100, and, following that, the system 100 negotiates the best price with one or more supplier category fulfillment destinations. This set of final offers is compared against offers received from the auction process 1340, a vertical exchange process 1345, and a horizontal marketplace process 1350 to determine the final best price offer 1335.30, which if accepted by the system 100, will prompt the customers for entering credit information 1335.35 and, if required 1335.40, connect the customers to a credit processor 940 for credit solutions. As shown in step 1335.45, the system collects final shipping information and payment from the customer and stores it into the customer sales database 600. After shipping and payment information acquisition, the system 100 completes the purchase transaction and confirms via e-mail the closing of the purchase transaction with the customers 1335.50.

In the auction process 1340, the auction server 1160 receives the demand packet 1340.05 and routes the demand packet to a plurality of auction category fulfillment destinations 1340.10 prior to which the auction server 1160 secures routing information from the product network database 700 and vice versa. Based on the information contained in the demand packet and the aggregated indications of interest obtained through the demand packet database 400, one or more auction category fulfillment destinations announce the offers which includes the pricing 1340.15. The offers are entered into a product pricing database 500, and the pricing information is e-mailed to participating customers for reconfirmation 1340.20. In a finite time frame, the system 100 collects reconfirmations from the customers that had placed an indication of interest 1340.25, and this information is provided for in the demand packet database 400 and the customer sales database 600. It be noted that one customer may for one previously entered indication of interest submit multiple reconfirmations to one or more of the offers received from the system 100. Upon transmitting the reconfirmations to all the auction category fulfillment destinations that had made an offer based on the demand packet, the pricing is confirmed by the system 100, and following that the system 100 negotiates the best price with one or more auction category fulfillment destinations. This set of final offers are compared against offers received from the supplier process 1335, a vertical exchange process 1345, and a horizontal marketplace process 1350 to determine the final best price offer 1340.30, which, if accepted by the system 100, will prompt the customers for entering credit information 1340.35 and, if required, 1340.40 connect the customers to a credit processor 940 for credit solutions. As shown in step 1340.45, the system collects final shipping information and payment from the customer and stores it into the customer sales database 600. After shipping and payment information acquisition, the system 100 completes the purchase transaction and confirms via e-mail the closing of the purchase transaction with the customers 1340.50.

In the vertical exchange process 1345, the vertical exchange server 1165 receives the demand packet 1345.05 and routes the demand packet to a plurality of vertical exchange category fulfillment destinations 1345.10 prior to which the vertical exchange server 1165 secures routing information from the product network database 700 and vice versa. Based on the information contained in the demand packet and the aggregated indications of interest obtained through the demand packet database 400, one or more vertical exchange category fulfillment destinations announce the offers which includes the pricing 1345.15. The offers are entered into a product pricing database 500, and the pricing information is e-mailed to participating customers for reconfirmation 1345.20. In a finite time frame, the system 100 collects reconfirmations from the customers that had placed an indication of interest 1345.25, and this information is provided for in the demand packet database 400 and the customer sales database 600. It should be noted that one customer may, for one previously entered indication of interest, submit multiple reconfirmations to one or more of the offers received from the system 100. Upon transmitting the reconfirmations to all the vertical exchange category fulfillment destinations that had made an offer based on the demand packet, the pricing is confirmed by the system 100, and following that, the system 100 negotiates the best price with one or more vertical exchange category fulfillment destinations. This set of final offers is compared against offers received from the supplier process 1335, the auction process 1340, and the horizontal marketplace process 1350 to determine the final best price offer 1345.30 which, if accepted by the system 100, will prompt the customers for entering credit information 1345.35 and, if required, 1345.40 connect the customers to a credit processor 940 for credit solutions. As shown in step 1345.45, the system collects final shipping information and payment from the customer and stores it into the customer sales database 600. After shipping and payment information acquisition, the system 100 completes the purchase transaction and confirms via e-mail the closing of the purchase transaction with the customers 1345.50.

In the horizontal marketplace process 1350, the horizontal marketplace server 1170 receives the demand packet 1350.05 and routes the demand packet to a plurality of horizontal marketplace category fulfillment destinations 1350.10 prior to which the horizontal marketplace server 1170 secures routing information from the product network database 700 and vice versa. Based on the information contained in the demand packet and the aggregated indications of interest obtained through the demand packet database 400, one or more horizontal marketplace category fulfillment destinations announce the offers which includes the pricing 1350.15. The offers are entered into a product pricing database 500, and the pricing information is e-mailed to participating customers for reconfirmation 1350.20. In a finite time frame, the system 100 collects reconfirmations from the customers that had placed an indication of interest 1350.25, and this information is provided for in the demand packet database 400 and the customer sales database 600. It should be noted that one customer may, for one previously entered indication of interest, submit multiple reconfirmations to one or more of the offers received from the system 100. Upon transmitting the reconfirmations to all the horizontal marketplace category fulfillment destinations that had made an offer based on the demand packet, the pricing is confirmed by the system 100, and, following that, the system 100 negotiates the best price with one or more horizontal marketplace category fulfillment destinations. This set of final offers are compared against offers received from the supplier process 1335, the auction process 1340, and the vertical exchange process 1350 to determine the final best price offer 1350.30 which, if accepted by the system 100, will prompt the customers for entering credit information 1350.35 and, if required, 1350.40 connect the customers to a credit processor 940 for credit solutions. As shown in step 1350.45, the system collects final shipping information and payment from the customer and stores it into the customer sales database 600. After shipping and payment information acquisition, the system 100 completes the purchase transaction and confirms via e-mail the closing of the purchase transaction with the customers 1350.50.

The customer history factor can be determined in a number of ways. As previously described, a customer's actual buying history may be used for determining the customer history factor. As an example, if a customer submits an indication of interest indicating that he or she will purchase a product, but actually purchases the product 20% of the time, that person's actual buying history (i.e., customer history factor in one embodiment) is 20%. However, such a simplistic model for determining a customer history factor can be expanded to include an unlimited number of variables or parameters and calculated using a variety of mathematical functions and statistical models.

The customer related variables (CRV) may be used in determining a customer history factor:

Rating variables: rating variables may include customer feedback score, customer rating, customer ranking, customer score, customer feedback rating, and so on. Feedback, such as feedback ratings, may be used to determine each member's feedback score. A positive rating may add a value, such as +1, to the customer's score, a negative rating may decrease a value, such as −1, from the customer's score, and a neutral rating may have no impact. The higher the feedback score, the more positive ratings the customer has received from members. In one embodiment, a member can increase or decrease another member's score by only ±1 no matter how many transactions they share.

Customer transaction variables: customer transaction variables may include most recent purchases, highest monetary transactions, average monetary transactions, buy rate, sell rate, return rate, indication rate, indication-to-buy rate, transaction frequency, transaction initiation rate, transaction close rate, and so on.

Demographic variables: demographic variables may include age, gender, race, education, occupation, income, religion, marital status, family size, number of children, home ownership status, socioeconomic status, and so on.

Geographic variables: geographic variables may include various classifications of geographic areas. For example, the classifications of geographic areas may include zip code, state, country, region, climate, population, and other geographical census data. In one embodiment, this information can come from national census data. Alternatively, maps, mapping databases, and other databases as understood in the art may be utilized to determine the geographic variables. A value may be assigned to the geographic variables depending on past, current, or future events affecting the location that a customer lives. For example, if a location is affected by a natural disaster, such as a hurricane or flood, the likelihood that the customer will purchase a product after submitting an indication of interest may be lower or higher depending on the particular product.

Psychographic variables: psychographic variables may include life style, personality, values, attitudes, and so on. These variables may be useful in predicting whether a customer will purchase a product after submitting an indication of interest at a later date. For example, if a customer's life style includes business travel, then the customer history factor may be decreased because there is a potential that the customer will be traveling when the product begins to sell and the customer will be unable to purchase the product or forget about the product.

Behavioral variables: behavioral variables may include product usage rate, brand loyalty, benefit sought, decision making units, ready-to-buy stage, consistent high-end product purchaser, and so on. A value may be assigned to the behavioral variables depending on a number of factors. For example, if a customer routinely purchases high-end products, then the customer may have a higher score for the high-end product purchaser variable than someone who does not routinely purchase high-end products.

Each of the customer related variables used for determining a customer history factor may be assigned a value. The values of the variables may be assigned numeric or alphanumeric values. The variables may be assigned values manually, semi-automatically, or automatically based on a variety of factors. The customer related variables may be used in mathematical functions in computing a customer history factor.

In addition to customer related variables, economic related variables (ERV) may be utilized in accordance with the principles of the present invention. Economic related variables may be related to macroeconomic or microeconomic factors. For example, macroeconomic variables may include household debt service burden, unemployment, consumer confidence index, producer price index, productivity report, retail sales index, durable goods orders, employment cost index, personal bankruptcy filings, inflation rate, GDP growth rate, S&P 500 stock market index, and so on. Microeconomic variables may be related to supply and demand related as to individual consumers and businesses in a local region, for example. Microeconomic variables may include supply of current certain products, current demand of certain products, local economy growth rate, consumer job status, consumer disposable income, and so forth. Applying microeconomic theory, if a particular region of the country is predicted to have a hurricane, certain products may be more important than others, such as flashlights, wood, and water. If a consumer has indicated that he or she wants to purchase a bedroom set, a value of a variable related to the purchase on a microeconomic level may be lowered.

Figure 14:
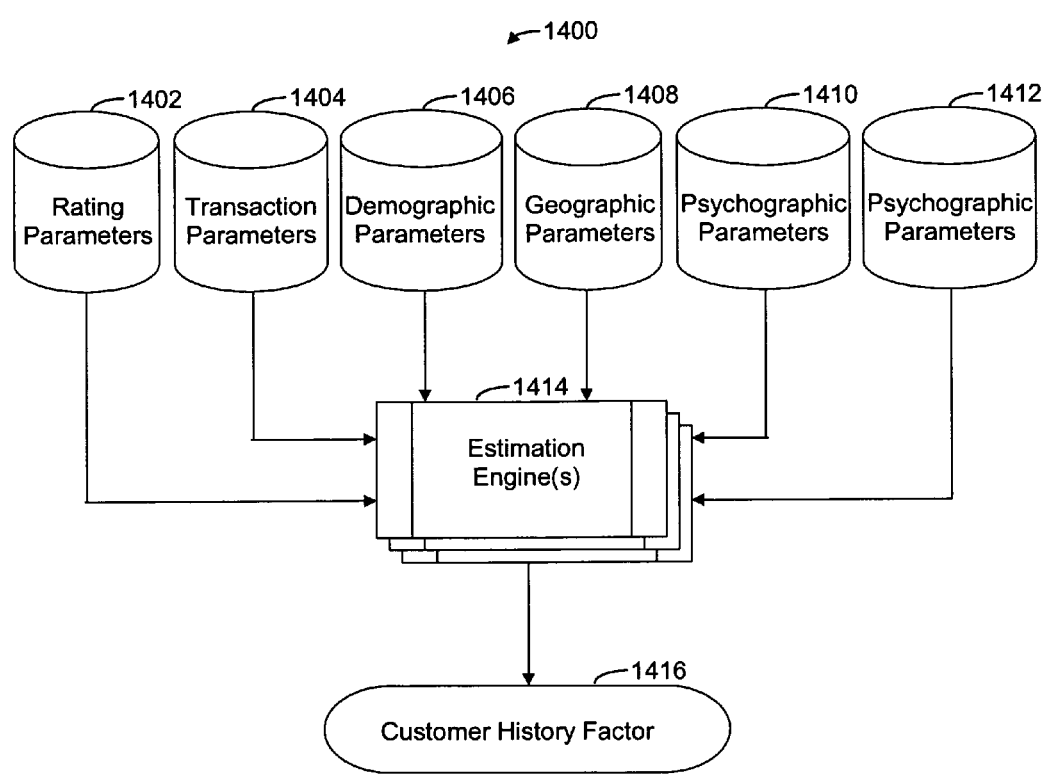
FIG. 14 is a block diagram of an exemplary system 1400 for determining a customer history factor from various input variables or parameters.

FIG. 14 is a block diagram of an exemplary system 1400 for determining a customer history factor from various input variables or parameters. The input parameters may be stored in one or more databases stored on a storage system (e.g., hard drive of a server). In one embodiment, the parameters may include rating parameters 1402, transaction parameters 1404, demographic parameters 1406, geographic parameters 1408, psychographic parameters 1410, and behavioral parameters 1412. Other and/or different parameters may be utilized in accordance with the principles of the present invention. One or more estimation engine(s) 1414 may be utilized to determine a customer history factor 1416 based on one or more parameters 1402-1412. The estimation engine(s) 1414 may be simple algebraic formulas (e.g., multiplication and addition) or more extensive logic and/or formulaic approaches, as described hereinbelow.

A customer history factor may be computed in an unlimited number of ways using the consumer related variables and economic related variables. Some mathematical computations and modeling approaches are provided below. It should be understood that these computations and approaches are exemplary and that other computations and approaches may be used to compute the customer history factor in accordance with the principles of the present invention. Furthermore, the customer related variables and economic related variables may be used in the computations and models in any combination that is helpful in determining the customer history factor to provide a more accurate estimate of how many units of a product to produce based on the indications of interest received from a new product offering. Below are exemplary mathematical models and formulas that may be used to compute the customer history factor using the consumer and/or economic related variables:

Linear Approach:

The linear models may be structured in the form of a cumulative model using customer and/or economic related variables or selective data models. Industry selective data models, such as recency, frequency, monetary (RFM) models and chi-squared automatic interaction detection (CHAID) analysis may be used wherever appropriate.

The CHAID analysis can incorporate recency, frequency and monetary variables, but can also examine other variables to increase predictive power. One embodiment may compute a customer history (CHF) as:

$$CHF\% = CRV\% * ERV\%$$

where $CRV\% = \Sigma\{CRV(1) \ldots CRV(n)\}/n$ or $$CRV\% = \Sigma\{CRV(1)/x \ldots CRV(n)/z\}$$

$$ERV\% = \Sigma\{ERV(1) \ldots ERV(n)\}/n$$

or $$ERV\% = \Sigma\{ERV(1)/x \ldots ERV(n)/z\}$$

Predictive neural network modeling is a very powerful predictive modeling technique. It is derived from nerve systems (e.g., human brains). The heart of the technique is a neural net (or network for short). A typical network includes layers of nodes and links between neighboring layers' nodes. The first layer is an input layer. Nodes of an input layer represent induction fields or values of nominal induction fields. The last layer is an output layer. Nodes of the output layer represent prediction values (or class names), i.e., values of a target field. The rest of layers are called hidden layers (or middle or internal layers). There is typically a single hidden layer, but there may be zero or more hidden layers. For example, the figure shown at the left-hand side contains a network that determines credit risk levels based on gender, age and salary. It includes an input layer of 15 nodes, one hidden layer of 15 nodes and an output layer of 3 nodes.

Figure 15:
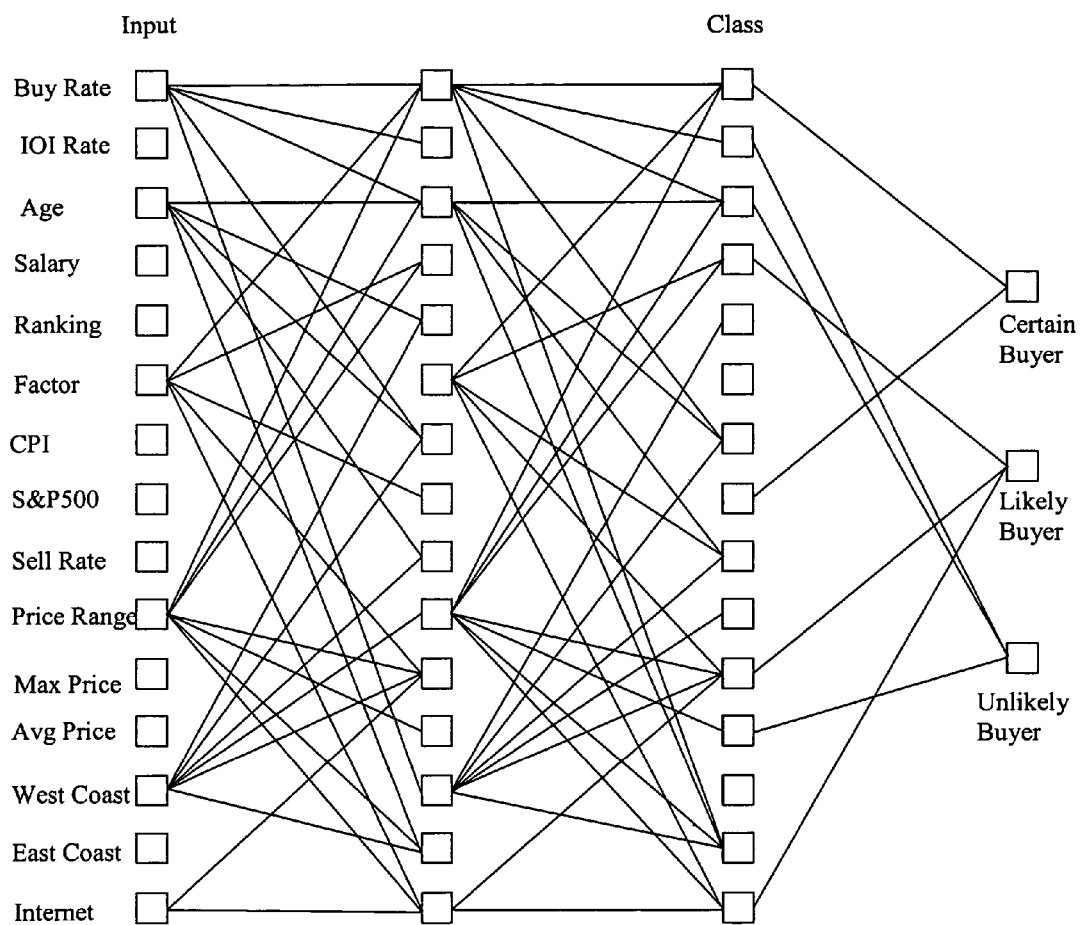
FIG. 15 is a block diagram of an exemplary neural network diagram that may be used to predict whether a potential buyer will become an actual buyer after submitting an indication of interest based on customer and economic related variables.

As understood in the art of neural networks, each link is assigned with a different weight. The weights provide for predictions from the neural network model, as understood in the art. As shown in FIG. 15, induction fields, in this case customer related variables and economic related variables, may be presented to the nodes of input layer. The values are propagated through the neural network to the output layer. In this process, the input values are multiplied with weights, summed, and applied to a non-linear function. The weights are set such that for given inputs, values of output layer reflect predictions, i.e., large values (e.g. 0.9) for positive predictions and small values (e.g., 0.1) for negative predictions. Output values are typically in the range of 0 and 1. For example, the network of FIG. 15 may output 0.6 for the "certain buyer" output node, 0.2 for the "likely buyer" output node, which predicts as a probable purchaser, and 0.2 for the "unlikely buyer" output node, which predicts as a non-purchaser. It is noted that combined output may not be equal to 1. Neural networks are "trained" to produce certain responses or predictions by an iterative process, and the weights applied to each input are adjusted to optimize a desired output.

Binary categorical input data for neural networks can be handled by using 0/1 (off/on) inputs, but categorical variables with multiple classes (for example, marital status or the state in which a person resides) are awkward to handle. Classifying a result into multiple categories usually is done by setting arbitrary value thresholds for discriminating one category from another. It would be difficult to devise a neural network to classify the location of residence into the 50 U.S. states. Classification trees, on the other hand, handle this type of problem naturally. Neural networks, unfortunately, do not present an model that is readily understandable as compared to a decision tree, which is easy to identify initial variables that divide the data into two categories and then other variables split the resulting child groups.

While a neural network is one potential predictive model that may be utilized to predict whether a potential purchaser of a product who submits an indication of interest, it should be understood that other predictive and non-predictive logical and mathematical models as understood in the art may be utilized to determine whether a potential purchaser who submits an indication of interest will ultimately purchase a product. For example, decision trees, stochastic gradient boosting, linear regression and non-linear regression may be utilized. Each of these models may enable the various consumer and economic related variables to be processed in making a determination. The result of the determination may be a percentage that can be used to determine if or how many products should be produced for a single potential purchaser or a group of potential purchasers. For example, if a potential purchaser submits an indication of interest indicating that he or she (or a business) is interested in purchasing 100 items of a product and the predictive model predicts, based on consumer and economic related variables associated with the potential purchaser, that the likelihood of that potential purchaser is 25%, then the manufacturer can determine that 25 of the 100 products should be produced for that person, thereby producing a more accurate demand or supply to minimizing production and demand overrun.

The previous description is of example embodiments for implementing the principles of the present invention, and the scope of the invention should not necessarily be limited by this description. The scope of the present invention is instead defined by the following claims.

What is claimed is:

1. A method for determining a price for a product, said method comprising:
    calculating, by a computing system, an aggregate customer history factor by aggregating customer history factors of potential purchasers in a buying group, the customer history factors including at least one of the following customer related parameters: customer rating parameter, customer transaction parameter, customer demographics parameter, customer geographics parameter, customer psychographic parameter, and customer behavioral parameter;
    calculating, by the computing system, a cumulative demand for a product as a function of (i) expected purchase quantities of the product indicated by the potential purchasers in the buying group and (ii) the aggregate customer history factor; and
    setting a price, by the computing system, of the product as a function of the cumulative demand for the buying group.

2. The method according to claim 1, wherein the customer rating parameter is a customer feedback score.

3. The method according to claim 1, wherein the customer transaction parameter is a function of at least one of most recent purchase, highest monetary transaction, average monetary transaction, buy rate, sell rate, return rate, indication rate, indication-to-buy rate, transaction frequency, transaction initiation rate, and transaction close rate.

4. The method according to claim 1, further comprising calculating an economic related parameter as a function of at least one of the following parameters: household debt service burden, unemployment, consumer confidence index, producer price index, productivity report, retail sales index, durable goods orders, employment cost index, personal bankruptcy filings, inflation rate, GDP growth rate, and S&P 500 stock market index.

5. The method according to claim 4, further comprising calculating the aggregate customer history factor as a function of the economic related parameter.

6. The method according to claim 5, wherein calculating the aggregate customer history factor includes utilizing a linear mathematical computation including at least one customer related parameter and at least one economic related parameter.

7. The method according to claim 5, wherein calculating the aggregate customer history factor includes utilizing a non-linear mathematical computation including at least one customer related parameter and at least one economic related parameter.

8. A system for determining a price for a product, said system comprising:
a memory configured to store historical purchasing information associated with potential purchasers of a product; and
a processor in communication with said memory and configured:
(i) to calculate an aggregate customer history factor by aggregating customer history factors of potential purchasers in a buying group, the customer history factors including at least one of the following customer related parameters: customer rating parameter, customer transaction parameter, customer demographics parameter, customer geographics parameter, customer psychographic parameter, and customer behavioral parameter;
(ii) to compute cumulative demand for a product as a function of:
(a) expected purchase quantities of the product indicated by the potential purchasers in the buying group and
(b) the aggregate customer history factor, and
(iii) to compute the price of the product as a function of the computed cumulative demand for the buying group.

9. The system according to claim 8, wherein the customer rating parameter is a customer feedback score.

10. The system according to claim 8, wherein the customer transaction parameter is a function of at least one of most recent purchase, highest monetary transaction, average monetary transaction, buy rate, sell rate, return rate, indication rate, indication-to-buy rate, transaction frequency, transaction initiation rate, and transaction close rate.

11. The system according to claim 8, wherein said processor is further configured to calculate an economic related parameter as a function of at least one of the following parameters: household debt service burden, unemployment, consumer confidence index, producer price index, productivity report, retail sales index, durable goods orders, employment cost index, personal bankruptcy filings, inflation rate, GDP growth rate, and S&P 500 stock market index.

12. The system according to claim 11, wherein said processor is further configured to calculate the aggregate customer history factor as a function of the economic related parameter.

13. The system according to claim 12, wherein calculation of the aggregate customer history factor includes utilizing a linear mathematical computation including at least one customer related parameter and at least one economic related parameter.

14. The system according to claim 12, wherein calculation of the aggregate customer history factor includes utilizing a non-linear mathematical computation including at least one customer related parameter and at least one economic related parameter.

15. A system for determining a price for a product, said system comprising:
means for computing an aggregate customer history factor by aggregating customer history factors of potential purchasers in a buying group, the customer history factors including at least one of the following customer related parameters: customer rating parameter, customer transaction parameter, customer demographics parameter, customer geographics parameter, customer psychographic parameter, and customer behavioral parameter;
means for determining a cumulative demand for a product as a function of (i) expected purchase quantities of the product indicated by the potential purchasers in the buying group and (ii) the aggregate customer history factor; and
means for setting a price of the product as a function of the cumulative demand for the buying group.

16. The system according to claim 15, wherein the product is available for purchase at the price at a future date and further comprising means for updating the customer history factors for the potential purchasers based on actual purchase quantities of the product on or after the future date and the expected purchase quantities for the product prior to the future date.

17. The system according to claim 15, further comprising means for updating the customer history factors for the potential purchasers based on actual purchase of at least one previously sold other product.

18. The system according to claim 15, further comprising means for setting an expected purchase quantity to a value in response to an indication of interest from a potential purchaser in purchasing the product.

19. The system according to claim 15, wherein the customer rating parameter is a customer feedback score.

20. The system according to claim 15, further comprising means for calculating an economic related parameter as a function of at least one of the following parameters: household debt service burden, unemployment, consumer confidence index, producer price index, productivity report, retail sales index, durable goods orders, employment cost index, personal bankruptcy filings, inflation rate, GDP growth rate, and S&P 500 stock market index.

21. The system according to claim 20, further comprising means for calculating the aggregate customer history factor as a function of the economic related parameter.

* * * * *

UNITED STATES PATENT AND TRADEMARK OFFICE
CERTIFICATE OF CORRECTION

| | |
|---|---|
| PATENT NO. | : 7,912,761 B2 |
| APPLICATION NO. | : 11/515113 |
| DATED | : March 22, 2011 |
| INVENTOR(S) | : Vaid |

It is certified that error appears in the above-identified patent and that said Letters Patent is hereby corrected as shown below:

Title Page, Column 1 (Assignee), Item (73), Line 1, Delete "Tech Venture" and insert --TechVenture --, therefor.

Signed and Sealed this
Tenth Day of May, 2011

David J. Kappos
*Director of the United States Patent and Trademark Office*